United States Patent
Van Phan et al.

(10) Patent No.: US 12,556,899 B2
(45) Date of Patent: Feb. 17, 2026

(54) METHOD, APPARATUS, AND COMPUTER PROGRAM PRODUCT FOR SERVICE-CONTINUITY INDICATION IN SIDELINK USER EQUIPMENT TO NETWORK RELAY DURING PATH SWITCH

(71) Applicant: Nokia Technologies Oy, Espoo (FI)

(72) Inventors: Vinh Van Phan, Oulu (FI); György Tamás Wolfner, Budapest (HU); Berthold Panzner, Holzkirchen (DE); Ling Yu, Kauniainen (FI); Lianghai Ji, Aalborg (DK); Jakob Lindbjerg Buthler, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 366 days.

(21) Appl. No.: 18/245,272

(22) PCT Filed: Sep. 23, 2021

(86) PCT No.: PCT/EP2021/076206
§ 371 (c)(1),
(2) Date: Mar. 14, 2023

(87) PCT Pub. No.: WO2022/089849
PCT Pub. Date: May 5, 2022

(65) Prior Publication Data
US 2023/0388769 A1 Nov. 30, 2023

Related U.S. Application Data

(60) Provisional application No. 63/106,999, filed on Oct. 29, 2020.

(51) Int. Cl.
*H04W 8/00* (2009.01)
*H04W 40/22* (2009.01)

(52) U.S. Cl.
CPC ........... *H04W 8/005* (2013.01); *H04W 40/22* (2013.01)

(58) Field of Classification Search
CPC ... H04W 8/005; H04W 40/22; H04W 36/033; H04W 48/16; H04W 76/14; H04W 76/23; H04W 76/27; H04W 88/04; H04W 92/18
See application file for complete search history.

(56) References Cited

U.S. PATENT DOCUMENTS 9,723,543 B2   8/2017   Suzuki et al.
10,743,235 B2  8/2020   Phan et al.
(Continued)

FOREIGN PATENT DOCUMENTS

EP    3281489 A1    2/2018
EP    3307011 A1    4/2018
WO    2016/164808 A1    10/2016

OTHER PUBLICATIONS

"Revised SID: Study on NR sidelink relay", 3GPP TSG RAN Meeting #89e, RP-201474, Agenda: 9.7.8, OPPO, Sep. 14-18, 2020, pp. 1-5.
(Continued)

*Primary Examiner* — Jae Y Lee
(74) *Attorney, Agent, or Firm* — Barta Jones, PLLC

(57) ABSTRACT

Methods, apparatuses, and computer program products are provided to facilitate relay discovery, selection, and/or reselection for U2N relaying over SL utilizing a service-continuity indication provided via one or more solicitation messages from a remote UE to at least one relay UE. In some embodiments, a serving network may provide identification of the at least one relay UE via a remote configuration for the remote UE. In some embodiments, the serving network may provide identification of the at least one relay UE via a response message transmitted to the remote UE via SL. In
(Continued)

some embodiments, the remote UE may prioritize one or more potential relay UE candidates identified by the serving network.

7 Claims, 9 Drawing Sheets

(56) References Cited

U.S. PATENT DOCUMENTS

| | | | |
|---|---|---|---|
| 2018/0139667 A1 | 5/2018 | Yu et al. | |
| 2021/0289580 A1* | 9/2021 | Damnjanovic | H04W 24/02 |
| 2023/0014030 A1* | 1/2023 | Li | H04W 76/10 |
| 2023/0180098 A1* | 6/2023 | Harounabadi | H04W 40/24 |
| | | | 370/315 |
| 2023/0247513 A1* | 8/2023 | Paladugu | H04W 88/04 |
| | | | 370/315 |

OTHER PUBLICATIONS

"3rd Generation Partnership Project; Technical Specification Group Services and System Aspects; Study on system enhancement for Proximity based Services (ProSe) in the 5G System (5GS) (Release 17)", 3GPP TR 23.752, V0.5.0, Sep. 2020, pp. 1-162.

"Summary Report of [Post111-e][622][Relay] Relay selection and reselection", 3GPP TSG-RAN WG2 #112-e, R2-2009523, Agenda: 8.7.3.3, Apple, Nov. 2-13, 2020, pp. 1-43.

"Discovery model and procedure", 3GPP TSG-RAN WG2 #111-e, R2-20xxxxx, Agenda: 8.7.4, OPPO, Aug. 2020, 2020, pp. 1-8.

"IEEE 802.11", Wikipedia, Retrieved on Apr. 11, 2023, Webpage available at : https://en.wikipedia.org/wiki/IEEE_802.11.

"IEEE 802.16", Wikipedia, Retrieved on Apr. 11, 2023, Webpage available at : https://en.wikipedia.org/wiki/IEEE_802.16.

"IEEE 802.3", Wikipedia, Retrieved on Apr. 11, 2023, Webpage available at : https://en.wikipedia.org/wiki/IEEE_802.3.

Invitation to Pay Additional Fees received for corresponding Patent Cooperation Treaty Application No. PCT/EP2021/076206, dated Jan. 4, 2022, 14 pages.

"Discussions on General Aspects of D2D UE-to-network Relay", 3GPP TSG-RAN WG1 Meeting #81, R1-152965, Agenda: 6.2.3.1. ZTE, May 25-29, 2015, 4 pages.

"UE-to-Network Relay release procedure", SA WG2 Meeting #109, S2-151613, Agenda: 6.10, LG Electronics, May 25-29, 2015, pp. 1-5.

"UE-to-Nwk Relay Discovery and (Re)selection for Path Switching", 3GPP TSG-RAN WG2 Meeting #113 Electronic, R2-2101211, Agenda: 8.7.3, Nokia, Jan. 25-Feb. 5, 2021, 4 pages.

International Search Report and Written Opinion received for corresponding Patent Cooperation Treaty Application No. PCT/EP2021/076206, dated Feb. 25, 2022, 22 pages.

* cited by examiner

METHOD, APPARATUS, AND COMPUTER PROGRAM PRODUCT FOR SERVICE-CONTINUITY INDICATION IN SIDELINK USER EQUIPMENT TO NETWORK RELAY DURING PATH SWITCH

RELATED APPLICATION

This application was originally filed as PCT Application No. PCT/EP2021/076206, filed on Sep. 23, 2021, which claims priority from U.S. Provisional Application No. 63/106,999, filed on Oct. 29, 2020, each of which is incorporated herein by reference in its entirety.

TECHNOLOGICAL FIELD

An example embodiment relates generally to supporting service-continuity indications during path switch for sidelink based user equipment to network relay between multiple user equipment.

BACKGROUND

A communication system can be seen as a facility that enables communication sessions between two or more entities such as user equipment (UE), base stations/access points, Network Functions (NF), and/or other nodes by providing connectivity between the various entities involved in the communication path. A communication system can be provided, for example, by means of a communication network and one or more compatible communication devices.

Telecommunication networks, such as the fifth generation of mobile networks (5G networks) are expected to be the next major phase of mobile telecommunication standards and to bring many improvements in the mobile network user experience. For instance, 5G networks should provide new technical solutions allowing a greater throughput, lower latency, higher reliability, higher connectivity, and higher mobility range. In addition to these improvements in terms of performance, 5G networks are also expected to extend the flexibility in the network usage and to provide users with a wider range of use cases and business models.

The 3rd Generation Partnership Project (3GPP) is a standards organization which develops protocols for mobile telephony and is known for the development and maintenance of various standards including second generation (2G), third generation (3G), fourth generation (4G), Long Term Evolution (LTE), and fifth generation (5G) standards. The 5G network has been designed as a Service Based Architecture (SBA), e.g., a system architecture in which the system functionality is achieved by a set of NFs providing services to other authorized NFs to access their services.

One method for extending the range and flexibility of such 5G networks is through wireless relaying. Wireless relaying in cellular networks provides the capability of extending coverage and improving transmission reliability. The 3GPP has standardized the relaying functionality and the concept of relaying has been evolved to combine it with device-to-device communications for further extending network coverage. Such device-to-device communications allow a remote UE to communicate with a network via one or more relay UEs, this is known as UE-to-Network (U2N) relaying. Such U2N relaying can help maintain connectivity for remote UEs losing coverage while in proximity to other UEs, that can act as relay UEs, that are still within coverage range of a Radio Access Network (RAN). The relay UEs may utilize, for example, Radio Resource Control (RRC) protocol, or the like, to communicate with one or more RAN nodes (e.g., gNB, etc.).

BRIEF SUMMARY

A method, apparatus, and computer program product are disclosed which provide for enhancements to relay UE candidate discovery by a remote UE in order to facilitate a more flexible and efficient relay selection/reselection process and provide service-continuity with NR SL based U2N relaying.

The ongoing study on New Radio (NR) Sidelink (SL) based U2N relaying in 3GPP considers both Layer 2 (L2) and Layer 3 (L3) relay options and possible support for service-continuity with path switch either within U2N relay mode with relay reselection or between U2N relay mode and direct access mode. 3GPP prioritizes common features applied for both L3 and L2 relay options, including relay discovery and relay selection and/or reselection. There are two discovery models specified in 3GPP, denoted as Model A and Model B. The first model, Model A, requires that the discovered or relay UE sends periodic presence announcement messages to other UEs or remote UEs in proximity of the relay UE. The second model, Model B, requires that the discovering or remote UE sends solicitation messages of its U2N relay discovery need to other UEs or relay UEs in proximity of the remote UE. In U2N relaying, the remote UE needs to discover a suitable set of relay UE candidates and select at least one relay UE from the suitable set of relay UE candidates for setting up U2N relaying between the remote UE and a serving network of the remote UE via the at least one selected relay UE and a serving network of the at least one selected relay UE. The serving network of the remote UE may be same as or different from the serving network of the at least one selected relay UE. The former is the case for L2 relay, including the serving RAN, or a node thereof (e.g., a next generation base station (gNB) for a 5G network, etc.).

Within U2N relaying systems problems arise when a remote UE has multiple suitable relay UE candidates from which to select. If all of the available relay UE candidates meet all Access Stratum layer (AS-layer) and higher layer criteria the remote UE does not know how to make the optimal selection. For the remote UE to make the best selection/reselection the remote UE needs to make considerations in the context of support for service-continuity as well as further relay UE discovery. In other words, the selection/reselection of relay UE candidates should consider how to provide the remote UE and/or the serving gNB with one or more potential relay UE candidates without causing excessive timing delays for the relay selection/reselection process to reassure fast setup of U2N relay for the remote UE during a path switch of the remote UE to the U2N relay.

Several enhancements to relay discovery systems for the remote UE are identified by the present disclosure to enable and facilitate flexible and efficient relay selection/reselection procedures in order to provide service-continuity for the remote UE with NR SL based U2N relaying. One such enhancement is to differentiate discovery messages (e.g., solicitation messages from the remote UE, etc.) when such discovery messages are being used for relay discovery, selection, and/or reselection for a possible path switch for the remote UE, as compared to when such discovery messages are being used for relay discovery, selection, and/or selection for an initial setup of a U2N relay connection to start or restart a service without a path switch. For example, if the remote UE has an ongoing data service via a network connection or path provided by a serving network and the remote UE has a need to find a relay UE in order to set up a U2N relay connection via the relay UE with the serving network for a path switch in order to continue with the ongoing data service then the remote UE can start to discover such the relay UE by using a service-continuity indication. The service-continuity indication may be transmitted in, or transmitted with, a respective discovery message. For example, the service-continuity indication may be sent as part of a solicitation message initiated by the remote UE upon determining a need for discovery of potential relay UE candidates for a possible path switch.

Another such enhancement provided by the present disclosure is to differentiate and provide additional information for related UE procedures of the remote UE and the relay UE depending on whether the service-continuity indication is sent or received with a respective solicitation message.

With respect to the procedures for the remote UE, if the solicitation message is sent with the service-continuity indication activated/enabled by the remote UE, the remote UE may be configured to receive additional information by way of one or more responses from one or more potential relay UE candidates and/or from the serving network (e.g., a network function thereof). For example, the remote UE may be configured to receive one or more response messages from one or more potential relay UE candidates that may include, without limitation, configuration information from the serving network. Additionally, the one or more response messages from one or more potential relay UE candidates may include, without limitation, a list of one or more potential relay UE candidates that can fulfill the service requirements of the remote UE. In some embodiments, the remote UE may be configured to receive a response message from its serving network (e.g., a network function thereof) that may include configuration information related to the serving network and a list of one or more potential relay UE candidates that can fulfill the service requirements. In an instance the solicitation message is sent without the service-continuity indication by the remote UE, the remote UE may then expect to receive one or more response messages from each of the individual potential relay UE candidates.

With respect to the procedures for a potential relay UE candidate, if a solicitation message is received, by the relay UE, with the service-continuity indication activated/enabled by the remote UE, then the relay UE may be configured to execute one or more procedures as follows. In some embodiments, upon receipt of the solicitation message that comprises a service-continuity indication, the relay UE may be configured to determine whether to be a relay UE candidate for the remote UE. In some embodiments, the determination of whether to be a relay UE for the remote UE may be based on a first set of predefined criteria. In an instance the relay UE makes a positive determination and determines to be a relay UE candidate for the remote UE, then the relay UE may be configured to further determine whether to report the remote UE's request to the serving network. In some embodiments, the relay UE may be configured to report the remote UE's request to the serving network to check for a suitable response message to the remote UE. In some embodiments, the relay UE may be configured to report the remote UE's request to the serving network to send a response message to the remote UE directly over SL. In some embodiments, the determination of whether to report the remote UE's request may be based on a second set of predefined criteria. In some embodiments, the relay UE may be in an RRC_IDLE or RRC_INACTIVE state and, upon determination that the predefined criteria to become a relay UE candidate are met, may be configured to transition from the RRC_IDLE or the RRC_INACTIVE to an RRC_CONNECTED state to report the remote UE's request to the serving network.

In some embodiments, upon receipt of the solicitation message that comprises a service-continuity indication, the relay UE may be configured to automatically report the remote UE's request to the serving network to check for a suitable response message to the remote UE. In some embodiments, upon receipt of the solicitation message that comprises a service-continuity active/enabled indication, the relay UE may be configured to automatically send a response message to the remote UE directly over SL.

In some embodiments, upon receipt of the solicitation message that comprises a service-continuity indication of active or enabled, the relay UE may also be configured to receive a configuration from the serving network. The configuration from the serving network may indicate to the relay UE whether to be a potential relay UE candidate for the remote UE and whether to respond to the remote UE or not. In an instance the relay UE is configured by the serving network to respond to the remote UE, the configuration may further provide instructions on how to respond to the remote UE and what information to transmit to the remote UE. In some embodiments, the configuration from the serving network may comprise a list of one or more potential relay UE candidates. In such embodiments, the list of one or more potential relay UE candidates may be generated by the serving network, or the like.

In some embodiments, upon receipt of the solicitation message that comprises a service-continuity indication, the relay UE may be configured to send a response message to the remote UE over SL. In some embodiments, the relay UE may be configured to send the response message to the remote UE over SL directly after the relay UE determines, based on a first set of criteria, whether to be a potential relay UE candidate for the remote UE. In some embodiments, the relay UE may be configured to send the response message to the remote UE over SL according to the configuration received from the serving network.

Moreover, upon receipt of a solicitation message that does not include a service-continuity indication, the relay UE may be configured to determine, based on a third set of criteria, whether to be a relay UE candidate for the remote UE and may be further configured to send a response message to the remote UE over SL indicating the determination based on the third set of criteria. In some embodiments, the relay UE may determine to act, or not to act, as a relay UE candidate for the remote UE. In some embodiments, the first, second, third, or fourth set of criteria, or the like, may comprise one or more of an RRC state (e.g., RRC_CONNECTED, etc.), an interface link (e.g., PC5 interface, etc.) quality, a UE capability (e.g., a relay capability, etc.), a UE capacity (e.g., a relay capacity, etc.), a quality of service class, a channel busy ratio, a radio access network node connection meeting one or more predefined constraints, a Sidelink Reference Signal Received Power (SL-RSRP), a predefined threshold value (e.g., upper, lower, minimum, and/or maximum limit value(s) associated with one or more metrics, or the like) for a criteria, or the like.

Another enhancement provided by the present disclosure is to authorize the serving network to configure and control the above procedures and operations of the remote UE and the relay UE. For examples, the serving network may enable or disable the support for service-continuity of the remote UE. The serving network may configure and control relay selection or reselection rules for the remote UE. The serving network may configure and control the first, second and third sets of criteria for the relay UE as well as the reporting of the relay UE. The serving network may further configure and control resources for the remote UE and the relay UE to perform the above procedures and operations. These configuration and control may be provided to the remote UE and the relay UE by the serving network using common or dedicated signaling or pre-configuration procedures. In some embodiments, the serving network may be configured to receive from one or more relay UEs one or more reporting messages. The one or more reporting messages received by the serving network from the one or more relay UEs may indicate a relay discovery request, e.g., the solicitation message with a service-continuity indication, received by a respective relay UE from a remote UE for possible path switch using U2N relaying. In some embodiments, the remote UE is out of communicable range with a serving network (e.g., a serving radio access network node, etc.) and the remote UE is within communicable range of one or more relay UEs and the one or more relay UEs are within communicable range of the serving network (e.g., a serving radio access network node). In such embodiments, the one or more relay UEs can relay communication signals between the remote UE and the serving network, thereby extending the effective communicable range between the remote UE and the serving network.

In some embodiments, the serving network may be configured to determine which of the one or more relay UEs that report to the serving network may be acting as a relay UE for the remote UE. In some embodiments, the serving network may be configured to select one or more potential relay UE candidates, out of the one or more relay UEs that report to the serving network, for the remote UE. In some embodiments, the serving network may be configured to determine a configuration for the one or more potential relay UE candidates and the configuration may comprise a list of the one or more potential relay UE candidates for the remote UE. In some embodiments, the serving network may be configured to transmit a configuration message comprising the determined configuration, referred to as the relay configuration, to at least one selected potential relay UE candidate. In some embodiments, the serving network may be configured to transmit a configuration message comprising the determined configuration, referred to as the remote configuration, to the remote UE, e.g., via the current network connection of the remote UE. The transmitted configuration message of the relay configuration may be configured to cause the at least one selected potential relay UE candidate to send a response message to the remote UE over SL according to the configuration. In some embodiments, the response message may comprise the list of one or more potential relay UE candidates.

In some embodiments, the network may be unable to identify at least one suitable potential relay UE candidate for the remote UE, out of the one or more relay UEs that report the remote UE's request to the serving network, and thus the network may trigger an RRC_Reconfiguration to reconfigure at least one relay UE, out of the one or more relay UEs that report the remote UE's request to the serving network, to be potential relay UE candidates for the remote UE. The RRC_Reconfiguration may be configured with adapted criteria and/or resource allocation in order to ensure such that the at least one reconfigured potential relay UE candidate can actually serve as a relay UE for the remote UE. In such embodiments, the at least one reconfigured relay UE is configured to fulfill the service-continuity requirements, and any other criteria, for the remote UE in the path switching process. For example, if a serving network determines that none of the available potential relay UE candidates can serve as a relay UE for the remote UE then the serving network may transmit an RRC_Reconfiguration to at least some available potential relay UE candidates. Further, one or more of the available potential relay UE candidates may be reconfigured, based on the RRC_Reconfiguration received from the serving network, and thus can be identified by the serving network to the remote UE as a potential relay UE candidate. In some embodiments, a plurality of potential relay UE candidates may be reconfigured such that they can serve as relay UEs to the remote UE during path switching. In some embodiments, the serving network may be configured to send the configuration to at least one selected potential relay UE candidate and/or to the remote UE. In some embodiments, the current network connection associated with the remote UE may be a direct cellular access connection via a serving gNB. In some embodiments, the current network connection associated with the remote UE may be a U2N relay connection via a serving relay UE and a serving gNB of the serving relay UE.

In accordance with some embodiments of the present disclosure a serving network is enabled such that the serving network has a certain level of control over providing an indication of one or more potential relay UE candidates to the remote UE. In some embodiments, the one or more potential relay UE candidates may be selected for the remote UE by the serving network. In other embodiments, the one or more potential relay UE candidates indicated by the serving network may be selected by the remote UE to set up a U2N relay connection for a path switch of the remote UE. The remote UE may be in need of relay selection or relay reselection in order to complete a path switch while utilizing U2N relaying techniques.

It should be appreciated in light of the present disclosure that providing the remote UE with the ability to control the actual relay selection or reselection allows for more flexibility and robustness. However, the serving network may have access to more detailed information that provides for a better understanding of each potential relay UE candidate's connection quality and each potential relay UE candidate's respective ability to serve the remote UE that is in need of a path switch to U2N relay via a potential relay UE candidate for service-continuity. Thus, it should be further appreciated in light of the present disclosure that providing a remote UE configuration comprising a list, or identification, of one or more potential relay UE candidates from the serving network may provide more reliable potential relay UE candidate selection by the remote UE during the path switch. In some embodiments, the potential relay UE candidate selected, by the remote UE or the serving network, to be the relay UE for the remote UE may need to provide a response to the remote UE's solicitation message before the remote UE can utilize the selected relay UE.

In some embodiments, a first potential relay UE candidate of a plurality of potential relay UE candidates may be connected to a first serving cell or a first serving network and a second potential relay UE candidate of the plurality of potential relay UE candidates may be connected to a second serving cell or a second serving network. For example, one or more potential relay UE candidates known to the remote UE may be connected to a different serving network or a different radio access network than one or more other potential relay UE candidates known to the remote UE. In some embodiments, the remote UE, one or more potential relay UEs, and/or the serving network (e.g., a radio access network, a radio access node, a network function, etc.) may use L2 and/or L3 relay options. In some embodiments, the serving network may comprise a network control entity. In some embodiments, the network control entity may, at least partially, comprise a network function, for example, an Access and Mobility Management Function (AMF) or the like. In some embodiments, the network control entity may, at least partially, comprise a radio access network node, for example, a gNB or the like. The network control entity may be configured to control the service-continuity for the remote UE.

According to an aspect of the present disclosure, there is provided a method that comprises causing transmission, by a remote user equipment, of a solicitation message for relay discovery over sidelink, wherein the solicitation message comprises a service-continuity indication. The method may further comprise receiving, by the remote user equipment, one or more response messages from one or more potential relay user equipment candidates over sidelink or a remote configuration from a serving network, wherein the one or more response messages or the remote configuration identify the one or more potential relay user equipment candidates, and wherein the remote user equipment prioritizes the one or more potential relay user equipment candidates.

In some embodiments of the method, the remote configuration is received via a network connection and the network connection comprises a direct cellular access connection via a serving radio access network node. In some embodiments of the method, the remote configuration is received via a network connection and the network connection comprises a user equipment to network relay connection via a serving relay user equipment and a serving radio access network node of the serving relay user equipment. In some embodiments of the method, the transmission of the solicitation message comprises causing a broadcast of the solicitation message within a communicable range of the remote user equipment. In some embodiments of the method, the broadcast of the solicitation message is configured for receipt by one or more of a relay user equipment within the communicable range of the remote user equipment. In some embodiments of the method, the service-continuity indication is transmitted via at least one of: sidelink control information that is used for scheduling the sidelink transmission of the solicitation message, a control element of a medium access control protocol, a radio resource control signaling message, or an information element in the solicitation message. In some embodiments of the method, the transmission of the solicitation message comprising the service-continuity indication utilizes an exclusive sidelink logical channel In some embodiments of the method, the exclusive sidelink logical channel is specified as a common sidelink logical channel to be used for transmitting the solicitation message by the remote user equipment for relay discovery over sidelink in an instance service-continuity is required by the remote user equipment. In some embodiments of the method, the service-continuity indication comprises assistance information. In some embodiments of the method, the assistance information comprises one or more of a remote access mode, a serving cell identity, a serving relay identity, a service characteristic, a service requirement, a user equipment capability, or a user equipment status.

According to an aspect of the present disclosure, there is provided an apparatus that comprises at least one processor and at least one memory with the at least one memory including computer program code, that is configured to, with the at least one processor, cause the apparatus at least to cause transmission, by a remote user equipment, of a solicitation message for relay discovery over sidelink, wherein the solicitation message comprises a service-continuity indication. The apparatus may be further caused to at least receive, by the remote user equipment, one or more response messages from one or more potential relay user equipment candidates over sidelink or a remote configuration from a serving network, wherein the one or more response messages or the remote configuration identify the one or more potential relay user equipment candidates, and wherein the remote user equipment prioritizes the one or more potential relay user equipment candidates.

In some embodiments of the apparatus, the remote configuration is received via a network connection and the network connection comprises a direct cellular access connection via a serving radio access network node. In some embodiments of the apparatus, the remote configuration is received via a network connection and the network connection comprises a user equipment to network relay connection via a serving relay user equipment and a serving radio access network node of the serving relay user equipment. In some embodiments of the apparatus, the transmission of the solicitation message comprises causing a broadcast of the solicitation message within a communicable range of the remote user equipment. In some embodiments of the apparatus, the broadcast of the solicitation message is configured for receipt by one or more of a relay user equipment within the communicable range of the remote user equipment. In some embodiments of the apparatus, the service-continuity indication is transmitted via at least one of: sidelink control information that is used for scheduling the sidelink transmission of the solicitation message, a control element of a medium access control protocol, a radio resource control signaling message, or an information element in the solicitation message. In some embodiments of the apparatus, the transmission of the solicitation message comprising the service-continuity indication utilizes an exclusive sidelink logical channel In some embodiments of the apparatus, the exclusive sidelink logical channel is specified as a common sidelink logical channel to be used for transmitting the solicitation message by the remote user equipment for relay discovery over sidelink in an instance service-continuity is required by the remote user equipment. In some embodiments of the apparatus, the service-continuity indication comprises assistance information. In some embodiments of the apparatus, the assistance information comprises one or more of a remote access mode, a serving cell identity, a serving relay identity, a service characteristic, a service requirement, a user equipment capability, or a user equipment status.

According to an aspect of the present disclosure, there is provided a computer program product that comprises at least a non-transitory computer readable storage medium having program code portions stored thereon with the program code portions being configured, upon execution by at least a processor, to cause transmission, by a remote user equipment, of a solicitation message for relay discovery over sidelink, wherein the solicitation message comprises a service-continuity indication. The computer program product may be further configured, upon execution by at least the processor, to at least receive, by the remote user equipment, one or more response messages from one or more potential relay user equipment candidates over sidelink or a remote configuration from a serving network, wherein the one or more response messages or the remote configuration identify the one or more potential relay user equipment candidates, and wherein the remote user equipment prioritizes the one or more potential relay user equipment candidates.

In some embodiments of the computer program product, the remote configuration is received via a network connection and the network connection comprises a direct cellular access connection via a serving radio access network node. In some embodiments of the computer program product, the remote configuration is received via a network connection and the network connection comprises a user equipment to network relay connection via a serving relay user equipment and a serving radio access network node of the serving relay user equipment. In some embodiments of the computer program product, the transmission of the solicitation message comprises causing a broadcast of the solicitation message within a communicable range of the remote user equipment. In some embodiments of the computer program product, the broadcast of the solicitation message is configured for receipt by one or more of a relay user equipment within the communicable range of the remote user equipment. In some embodiments of the computer program product, the service-continuity indication is transmitted via at least one of: sidelink control information that is used for scheduling the sidelink transmission of the solicitation message, a control element of a medium access control protocol, a radio resource control signaling message, or an information element in the solicitation message. In some embodiments of the computer program product, the transmission of the solicitation message comprising the service-continuity indication utilizes an exclusive sidelink logical channel In some embodiments of the computer program product, the exclusive sidelink logical channel is specified as a common sidelink logical channel to be used for transmitting the solicitation message by the remote user equipment for relay discovery over sidelink in an instance service-continuity is required by the remote user equipment. In some embodiments of the computer program product, the service-continuity indication comprises assistance information. In some embodiments of the computer program product, the assistance information comprises one or more of a remote access mode, a serving cell identity, a serving relay identity, a service characteristic, a service requirement, a user equipment capability, or a user equipment status.

According to an aspect of the present disclosure, there is provided an apparatus that comprises means for causing transmission, by a remote user equipment, of a solicitation message for relay discovery over sidelink, wherein the solicitation message comprises a service-continuity indication. The apparatus may further comprise means for receiving, by the remote user equipment, one or more response messages from one or more potential relay user equipment candidates over sidelink or a remote configuration from a serving network, wherein the one or more response messages or the remote configuration identify the one or more potential relay user equipment candidates, and wherein the remote user equipment prioritizes the one or more potential relay user equipment candidates.

In some embodiments of the apparatus, the remote configuration is received via a network connection and the network connection comprises a direct cellular access connection via a serving radio access network node. In some embodiments of the apparatus, the remote configuration is received via a network connection and the network connection comprises a user equipment to network relay connection via a serving relay user equipment and a serving radio access network node of the serving relay user equipment. In some embodiments of the apparatus, the transmission of the solicitation message comprises causing a broadcast of the solicitation message within a communicable range of the remote user equipment. In some embodiments of the apparatus, the broadcast of the solicitation message is configured for receipt by one or more of a relay user equipment within the communicable range of the remote user equipment. In some embodiments of the apparatus, the service-continuity indication is transmitted via at least one of: sidelink control information that is used for scheduling the sidelink transmission of the solicitation message, a control element of a medium access control protocol, a radio resource control signaling message, or an information element in the solicitation message. In some embodiments of the apparatus, the transmission of the solicitation message comprising the service-continuity indication utilizes an exclusive sidelink logical channel In some embodiments of the apparatus, the exclusive sidelink logical channel is specified as a common sidelink logical channel to be used for transmitting the solicitation message by the remote user equipment for relay discovery over sidelink in an instance service-continuity is required by the remote user equipment. In some embodiments of the apparatus, the service-continuity indication comprises assistance information. In some embodiments of the apparatus, the assistance information comprises one or more of a remote access mode, a serving cell identity, a serving relay identity, a service characteristic, a service requirement, a user equipment capability, or a user equipment status.

According to an aspect of the present disclosure, there is provided a method that comprises receiving, by a relay user equipment, a solicitation message for relay discovery from a remote user equipment over sidelink, wherein the solicitation message comprises a service-continuity indication. The method may further comprise determining, based on a first set of criteria, that the relay user equipment may serve as a relay user equipment candidate for the remote user equipment. The method may further comprise determining, based on a second set of criteria, that the relay user equipment is to report information relating to the remote user equipment to a serving network. The method may further comprise causing transmission, via a network connection, of a reporting message to the serving network. The method may further comprise receiving, via the network connection, a relay configuration from the serving network. The method may further comprise causing transmission of a response message to the remote user equipment over sidelink according to the relay configuration received from the serving network.

In some embodiments of the method, the relay configuration comprises control information specifying information for responding to the remote user equipment. In some embodiments of the method, the relay configuration identifies one or more potential relay user equipment candidates. In some embodiments of the method, the response message identifies one or more potential relay user equipment candidates. In some embodiments of the method, the first set of criteria or the second set of criteria comprises one or more of a radio resource control state, an interface link quality, a user equipment capability, a user equipment capacity, a quality of service class, a channel busy ratio, or a radio access network node connection meeting one or more predefined constraints. In some embodiments of the method, if the relay user equipment is in either a radio resource control idle state or a radio resource control inactive state and the relay user equipment receives a relay request message after sending the response message to the remote user equipment, then the relay user equipment causes a state transition to a radio resource control connected state.

According to an aspect of the present disclosure, there is provided an apparatus that comprises at least one processor and at least one memory with the at least one memory including computer program code, that is configured to, with the at least one processor, cause the apparatus at least to receive, by a relay user equipment, a solicitation message for relay discovery from a remote user equipment over sidelink, wherein the solicitation message comprises a service-continuity indication. The apparatus may be further caused to at least determine, based on a first set of criteria, that the relay user equipment may serve as a relay user equipment candidate for the remote user equipment. The apparatus may be further caused to at least determine, based on a second set of criteria, that the relay user equipment is to report information relating to the remote user equipment to a serving network. The apparatus may be further caused to at least cause transmission, via a network connection, of a reporting message to the serving network. The apparatus may be further caused to at least receive, via the network connection, a relay configuration from the serving network. The apparatus may be further caused to at least cause transmission of a response message to the remote user equipment over sidelink according to the relay configuration received from the serving network.

In some embodiments of the apparatus, the relay configuration comprises control information specifying information for responding to the remote user equipment. In some embodiments of the apparatus, the relay configuration identifies one or more potential relay user equipment candidates. In some embodiments of the apparatus, the response message identifies one or more potential relay user equipment candidates. In some embodiments of the apparatus, the first set of criteria or the second set of criteria comprises one or more of a radio resource control state, an interface link quality, a user equipment capability, a user equipment capacity, a quality of service class, a channel busy ratio, or a radio access network node connection meeting one or more predefined constraints. In some embodiments of the apparatus, if the relay user equipment is in either a radio resource control idle state or a radio resource control inactive state and the relay user equipment receives a relay request message after sending the response message to the remote user equipment, then the relay user equipment causes a state transition to a radio resource control connected state.

According to an aspect of the present disclosure, there is provided a computer program product that comprises at least a non-transitory computer readable storage medium having program code portions stored thereon with the program code portions being configured, upon execution by at least a processor, to receive, by a relay user equipment, a solicitation message for relay discovery from a remote user equipment over sidelink, wherein the solicitation message comprises a service-continuity indication. The computer program product may be further configured, upon execution by at least the processor, to at least determine, based on a first set of criteria, that the relay user equipment may serve as a relay user equipment candidate for the remote user equipment. The computer program product may be further configured, upon execution by at least the processor, to at least determine, based on a second set of criteria, that the relay user equipment is to report information relating to the remote user equipment to a serving network. The computer program product may be further configured, upon execution by at least the processor, to at least cause transmission, via a network connection, of a reporting message to the serving network. The computer program product may be further configured, upon execution by at least the processor, to at least receive, via the network connection, a relay configuration from the serving network. The computer program product may be further configured, upon execution by at least the processor, to at least cause transmission of a response message to the remote user equipment over sidelink according to the relay configuration received from the serving network.

In some embodiments of the computer program product, the relay configuration comprises control information specifying information for responding to the remote user equipment. In some embodiments of the computer program product, the relay configuration identifies one or more potential relay user equipment candidates. In some embodiments of the computer program product, the response message identifies one or more potential relay user equipment candidates. In some embodiments of the computer program product, the first set of criteria or the second set of criteria comprises one or more of a radio resource control state, an interface link quality, a user equipment capability, a user equipment capacity, a quality of service class, a channel busy ratio, or a radio access network node connection meeting one or more predefined constraints. In some embodiments of the computer program product, if the relay user equipment is in either a radio resource control idle state or a radio resource control inactive state and the relay user equipment receives a relay request message after sending the response message to the remote user equipment, then the relay user equipment causes a state transition to a radio resource control connected state.

According to an aspect of the present disclosure, there is provided an apparatus that comprises means for receiving, by a relay user equipment, a solicitation message for relay discovery from a remote user equipment over sidelink, wherein the solicitation message comprises a service-continuity indication. The apparatus may further comprise means for determining, based on a first set of criteria, that the relay user equipment may serve as a relay user equipment candidate for the remote user equipment. The apparatus may further comprise means for determining, based on a second set of criteria, that the relay user equipment is to report information relating to the remote user equipment to a serving network. The apparatus may further comprise means for causing transmission, via a network connection, of a reporting message to the serving network. The apparatus may further comprise means for receiving, via the network connection, a relay configuration from the serving network. The apparatus may further comprise means for causing transmission of a response message to the remote user equipment over sidelink according to the relay configuration received from the serving network.

In some embodiments of the apparatus, the relay configuration comprises control information specifying information for responding to the remote user equipment. In some embodiments of the apparatus, the relay configuration identifies one or more potential relay user equipment candidates. In some embodiments of the apparatus, the response message identifies one or more potential relay user equipment candidates. In some embodiments of the apparatus, the first set of criteria or the second set of criteria comprises one or more of a radio resource control state, an interface link quality, a user equipment capability, a user equipment capacity, a quality of service class, a channel busy ratio, or a radio access network node connection meeting one or more predefined constraints. In some embodiments of the apparatus, if the relay user equipment is in either a radio resource control idle state or a radio resource control inactive state and the relay user equipment receives a relay request message after sending the response message to the remote user equipment, then the relay user equipment causes a state transition to a radio resource control connected state.

According to an aspect of the present disclosure, there is provided a method that comprises receiving, via at least one radio access network node associated with a serving network, one or more reporting messages from one or more relay user equipment. The method may further comprise selecting, from among the one or more relay user equipment, one or more potential relay user equipment candidates for a remote user equipment. The method may further comprise causing transmission, via the at least one radio access network node, of a relay configuration to at least one potential relay user equipment candidate of the one or more potential relay user equipment candidates.

In some embodiments, the method may further comprise causing transmission, via the at least one radio access network node, of a remote configuration to the remote user equipment. In some embodiments of the method, the remote configuration identifies one or more potential relay user equipment candidates. In some embodiments of the method, the one or more potential relay user equipment candidates are to be prioritized by the remote user equipment. In some embodiments, the method may further comprise causing transmission of one or more paging messages to a plurality of potential relay user equipment candidates. In some embodiments of the method, each of the plurality of potential relay user equipment candidates are determined by the serving network to be a respective potential relay user equipment candidate for the remote user equipment. In some embodiments of the method, the relay configuration comprises control information specifying information for the at least one potential relay user equipment candidate to respond to the remote user equipment. In some embodiments of the method, the relay configuration identifies one or more potential relay user equipment candidates, and wherein the one or more potential relay user equipment candidates are to be prioritized by the remote user equipment.

According to an aspect of the present disclosure, there is provided an apparatus that comprises at least one processor and at least one memory with the at least one memory including computer program code, that is configured to, with the at least one processor, cause the apparatus at least to receive, via at least one radio access network node associated with a serving network, one or more reporting messages from one or more relay user equipment. The apparatus may be further caused to at least select, from among the one or more relay user equipment, one or more potential relay user equipment candidates for a remote user equipment. The apparatus may be further caused to at least cause transmission, via the at least one radio access network node, of a relay configuration to at least one potential relay user equipment candidate of the one or more potential relay user equipment candidates.

In some embodiments, the at least one memory and the computer program code configured to, with the at least one processor, further cause the apparatus at least to cause transmission, via the at least one radio access network node, of a remote configuration to the remote user equipment. In some embodiments of the apparatus, the remote configuration identifies one or more potential relay user equipment candidates. In some embodiments of the apparatus, the one or more potential relay user equipment candidates are to be prioritized by the remote user equipment. In some embodiments, the at least one memory and the computer program code configured to, with the at least one processor, further cause the apparatus at least to cause transmission of one or more paging messages to a plurality of potential relay user equipment candidates. In some embodiments of the apparatus, each of the plurality of potential relay user equipment candidates are determined by the serving network to be a respective potential relay user equipment candidate for the remote user equipment. In some embodiments of the apparatus, the relay configuration comprises control information specifying information for the at least one potential relay user equipment candidate to respond to the remote user equipment. In some embodiments of the apparatus, the relay configuration identifies one or more potential relay user equipment candidates, and wherein the one or more potential relay user equipment candidates are to be prioritized by the remote user equipment.

According to an aspect of the present disclosure, there is provided a computer program product that comprises at least a non-transitory computer readable storage medium having program code portions stored thereon with the program code portions being configured, upon execution by at least a processor, to receive, via at least one radio access network node associated with a serving network, one or more reporting messages from one or more relay user equipment. The computer program product may be further configured, upon execution by at least the processor, to at least select, from among the one or more relay user equipment, one or more potential relay user equipment candidates for a remote user equipment. The computer program product may be further configured, upon execution by at least the processor, to at least cause transmission, via the at least one radio access network node, of a relay configuration to at least one potential relay user equipment candidate of the one or more potential relay user equipment candidates.

In some embodiments, the computer program product may be further configured, upon execution by at least the processor, to at least cause transmission, via the at least one radio access network node, of a remote configuration to the remote user equipment. In some embodiments of the computer program product, the remote configuration identifies one or more potential relay user equipment candidates. In some embodiments of the computer program product, the one or more potential relay user equipment candidates are to be prioritized by the remote user equipment. In some embodiments, the computer program product may be further configured, upon execution by at least the processor, to at least cause transmission of one or more paging messages to a plurality of potential relay user equipment candidates. In some embodiments of the computer program product, each of the plurality of potential relay user equipment candidates are determined by the serving network to be a respective potential relay user equipment candidate for the remote user equipment. In some embodiments of the computer program product, the relay configuration comprises control information specifying information for the at least one potential relay user equipment candidate to respond to the remote user equipment. In some embodiments of the computer program product, the relay configuration identifies one or more potential relay user equipment candidates, and wherein the one or more potential relay user equipment candidates are to be prioritized by the remote user equipment.

According to an aspect of the present disclosure, there is provided an apparatus that comprises means for receiving, via at least one radio access network node associated with a serving network, one or more reporting messages from one or more relay user equipment. The apparatus may further comprise means for selecting, from among the one or more relay user equipment, one or more potential relay user equipment candidates for a remote user equipment. The apparatus may further comprise means for causing transmission, via the at least one radio access network node, of a relay configuration to at least one potential relay user equipment candidate of the one or more potential relay user equipment candidates.

In some embodiments, the apparatus may further comprise means for causing transmission, via the at least one radio access network node, of a remote configuration to the remote user equipment. In some embodiments of the apparatus, the remote configuration identifies one or more potential relay user equipment candidates. In some embodiments of the apparatus, the one or more potential relay user equipment candidates are to be prioritized by the remote user equipment. In some embodiments, the apparatus may further comprise means for causing transmission of one or more paging messages to a plurality of potential relay user equipment candidates. In some embodiments of the apparatus, each of the plurality of potential relay user equipment candidates are determined by the serving network to be a respective potential relay user equipment candidate for the remote user equipment. In some embodiments of the apparatus, the relay configuration comprises control information specifying information for the at least one potential relay user equipment candidate to respond to the remote user equipment. In some embodiments of the apparatus, the relay configuration identifies one or more potential relay user equipment candidates, and wherein the one or more potential relay user equipment candidates are to be prioritized by the remote user equipment.

Various other aspects are also described in the following detailed description and in the attached claims.

BRIEF DESCRIPTION OF THE DRAWINGS

Figure 1:
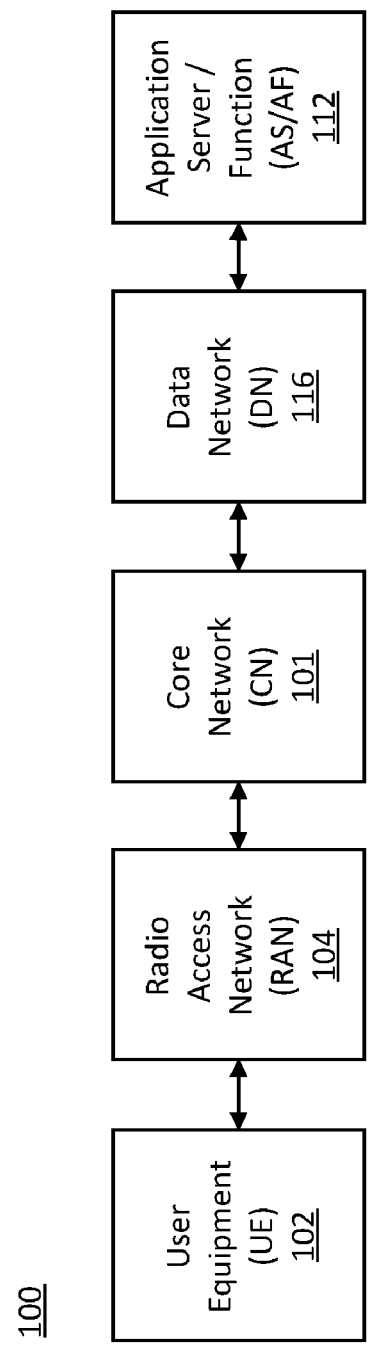
Figure 2:
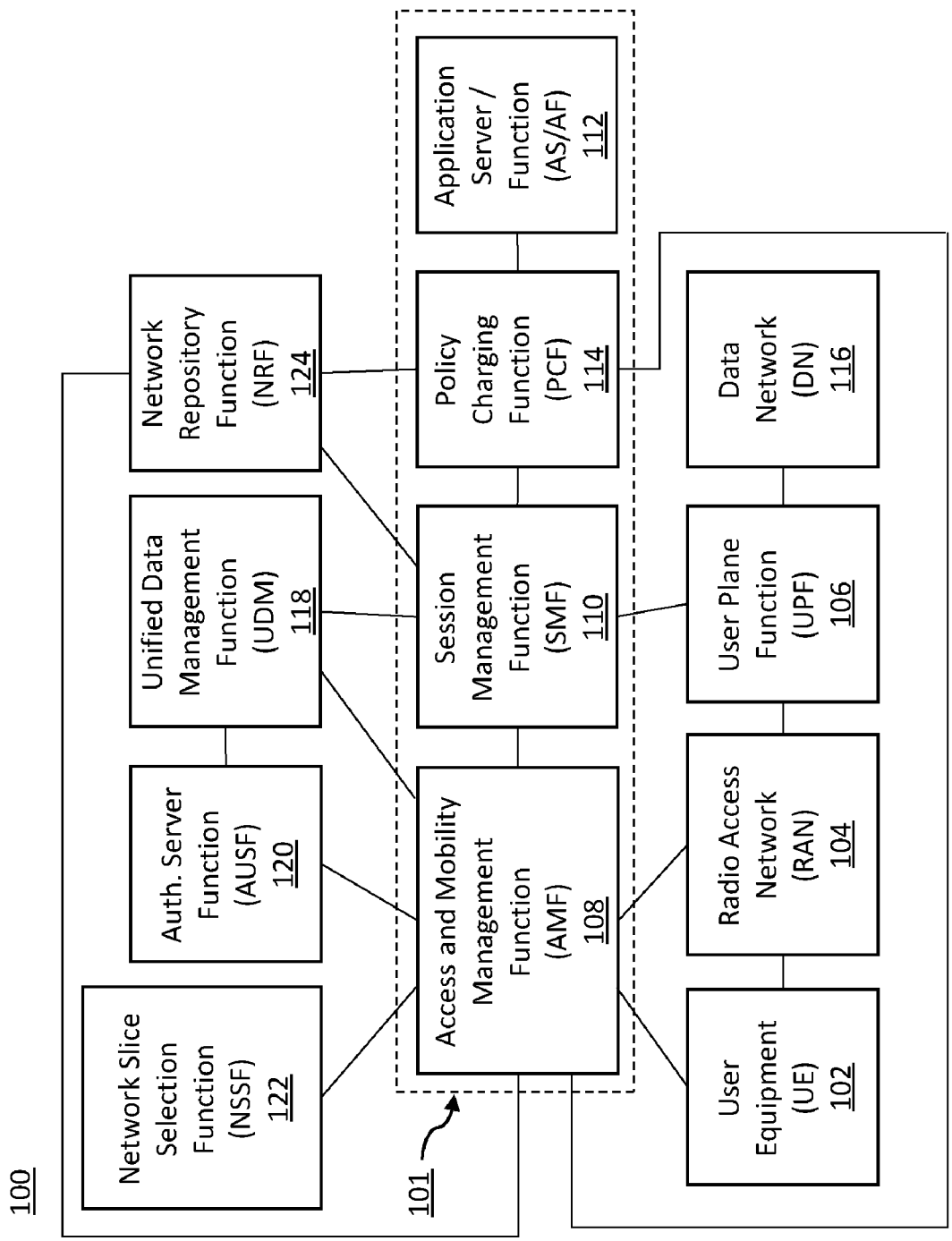
Figure 3:
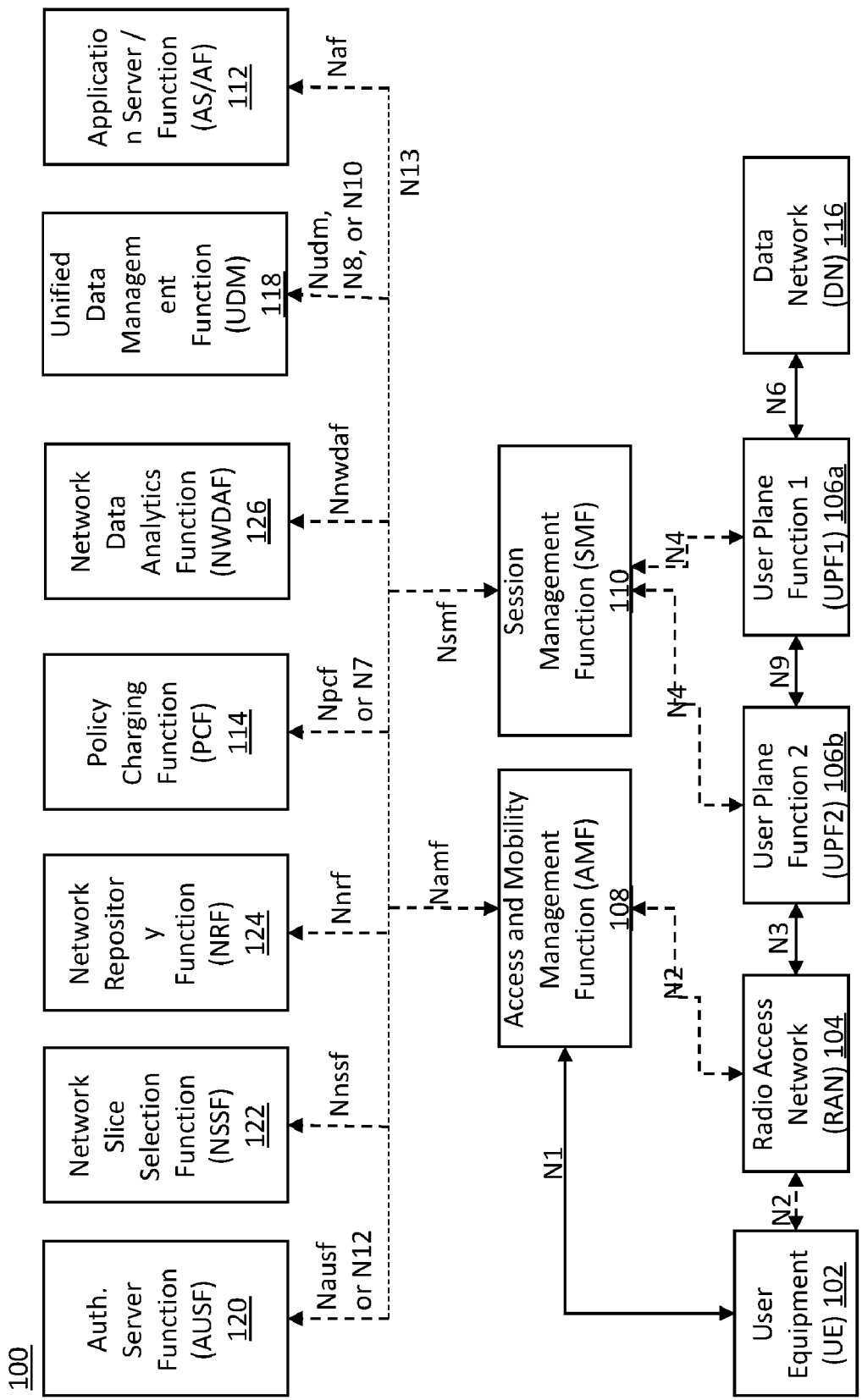
Figure 4:
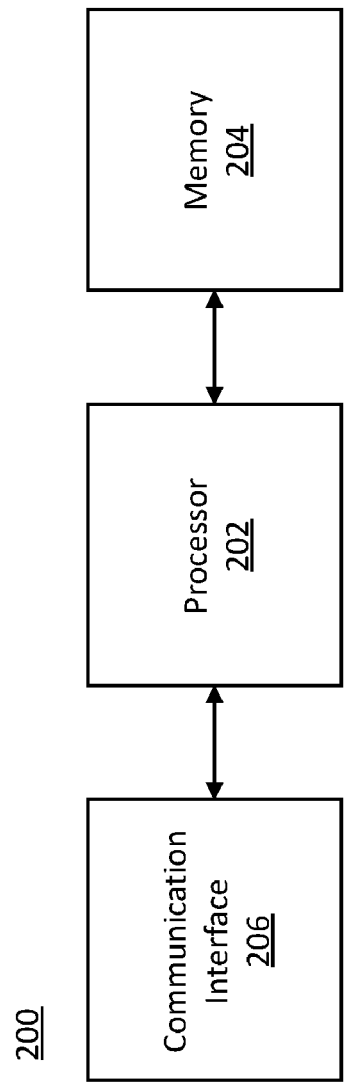
Figure 5:
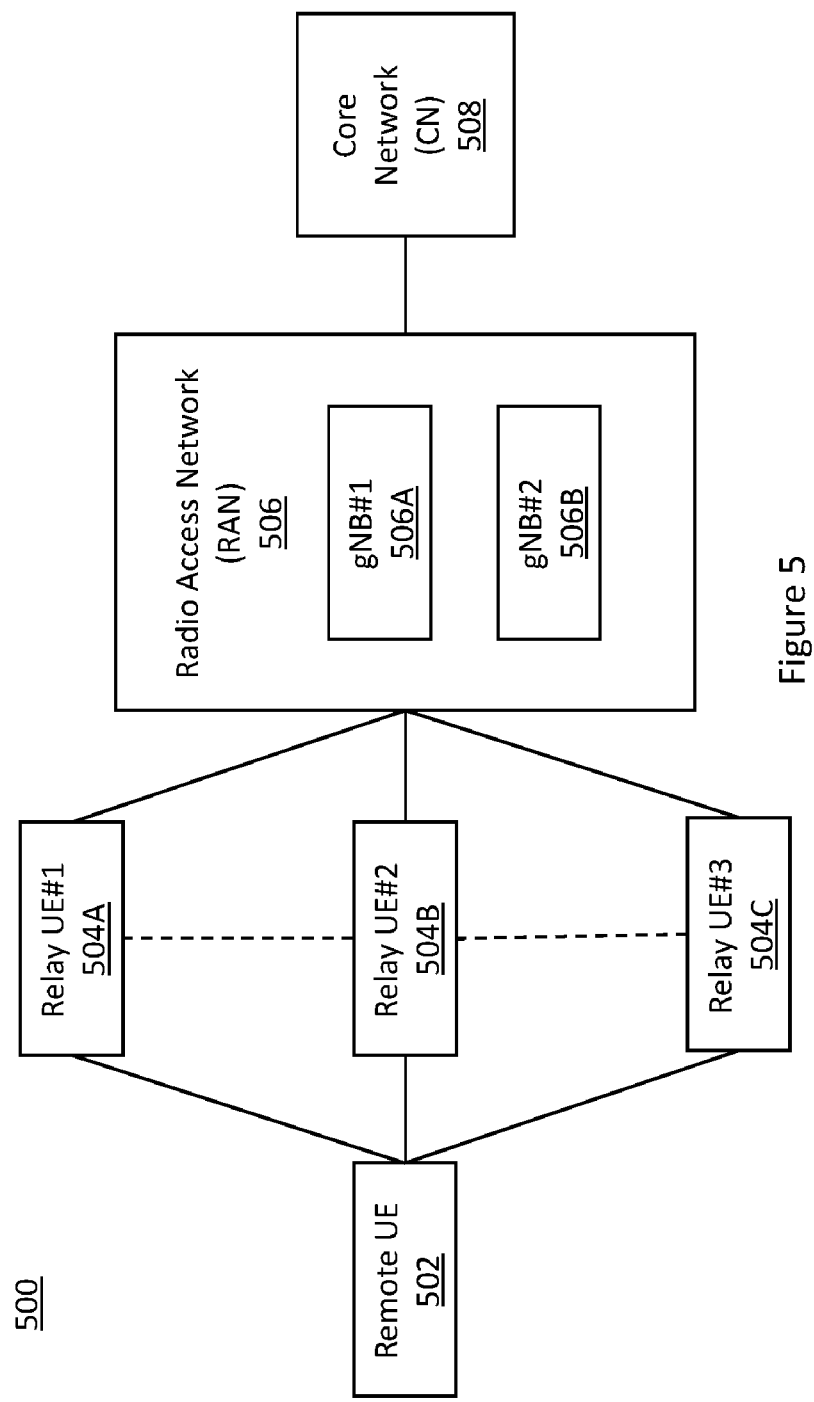
Figure 6:
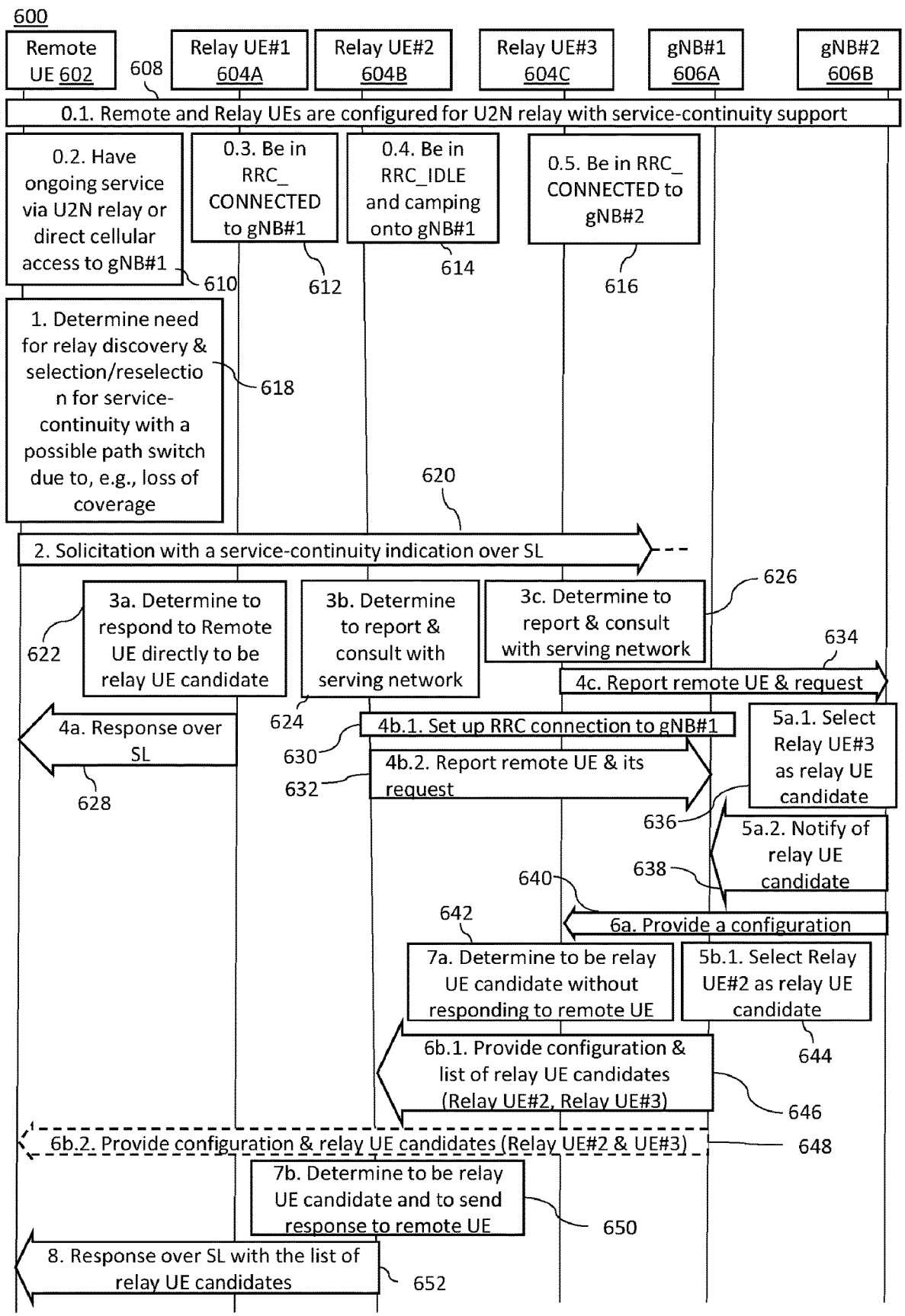
Figure 7:
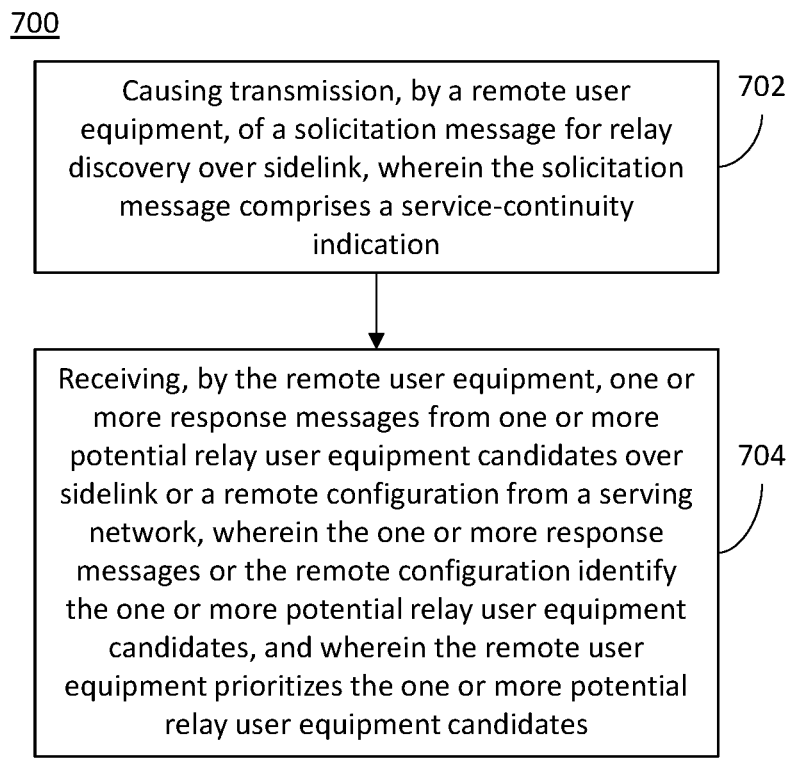
Figure 8:
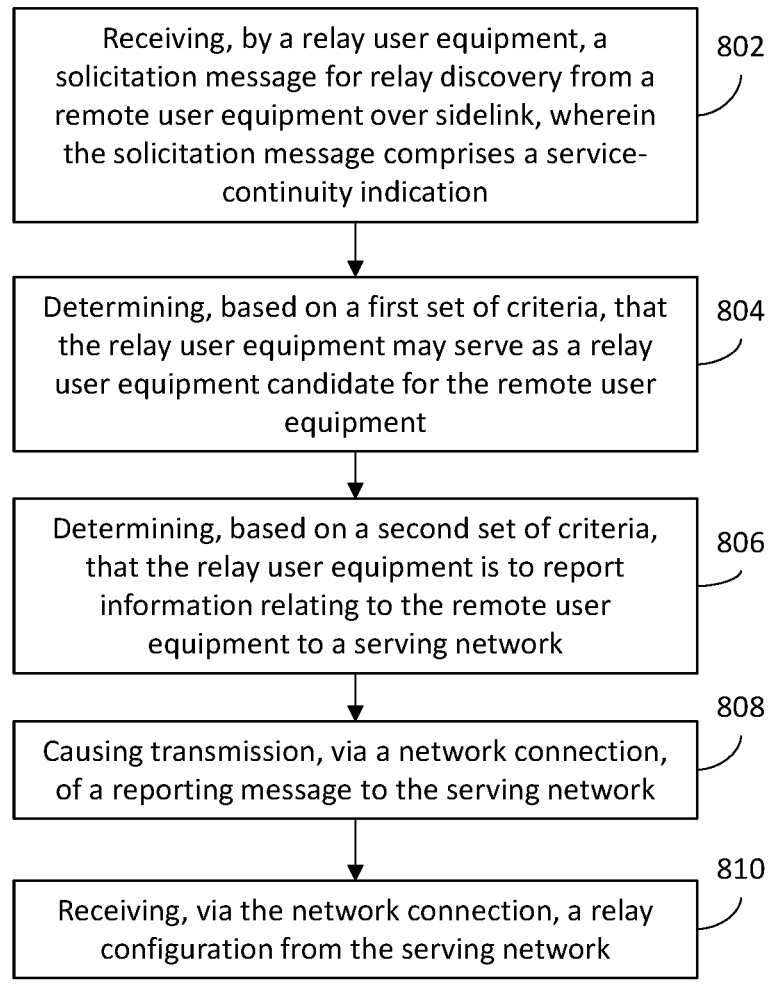
Figure 9:
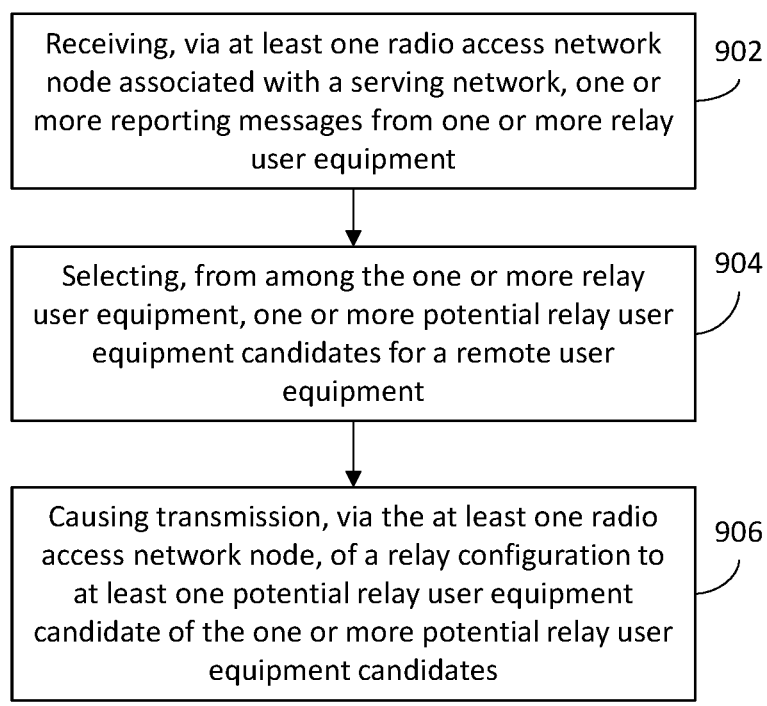

Having thus described certain example embodiments of the disclosure in general terms, reference will now be made to the accompanying drawings, which are not necessarily drawn to scale, and wherein:

FIG. 1 illustrates an example architecture for a communications network, according to some embodiments;

FIG. 2 illustrates an example architecture for a communications network, according to some embodiments;

FIG. 3 illustrates an example architecture for a communications network, according to some embodiments;

FIG. 4 illustrates an example computing device for communicating over communication networks with other network entities, according to some embodiments;

FIG. 5 illustrates an example communication network between a remote UE and a network, according to some embodiments;

FIG. 6 is a flow diagram illustrating the signaling between network entities via a network infrastructure, according to some embodiments;

FIG. 7 is a flow chart illustrating example operations performed, such as by a communication device or other client device, in accordance with some example embodiments;

FIG. 8 is a flow chart illustrating example operations performed, such as by a communication device or other client device, in accordance with some example embodiments; and FIG. 9 is a flow chart illustrating example operations performed, such as by a communication device or other client device, in accordance with some example embodiments.

DETAILED DESCRIPTION

Some embodiments of the present disclosure will now be described more fully hereinafter with reference to the accompanying drawings, in which some, but not all, embodiments of the present disclosure are shown. Indeed, various embodiments of the present disclosure can be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms can be used interchangeably to refer to data capable of being transmitted, received and/or stored in accordance with certain embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Additionally, as used herein, the terms "node," "entity," "intermediary," "intermediate entity," "go-between," and similar terms can be used interchangeably to refer to computers connected via, or programs running on, a network or plurality of networks capable of data creation, modification, deletion, transmission, receipt, and/or storage in accordance with an example embodiment of the present disclosure.

Additionally, as used herein, the terms "user equipment," "user device," "device," "apparatus," "mobile device," "personal computer," "laptop computer," "laptop," "desktop computer," "desktop," "mobile phone," "tablet," "smartphone," "smart device," "cellphone," "computing device," "communication device," "user communication device," "terminal," and similar terms can be used interchangeably to refer to an apparatus, such as may be embodied by a computing device, configured to access a network or plurality of networks for at least the purpose of wired and/or wireless transmission of communication signals in accordance with certain embodiments of the present disclosure.

Additionally, as used herein, the terms "network," "serving network," and similar terms can be used interchangeably to refer to an end to end logical communication network, or portion thereof (e.g., a network slice), such as a Public Land Mobile Network (PLMN), Stand-Alone Non-Public Network (SNPN), a Public Network Integrated NPN (PNI-NPN), and/or a radio access network communicably connected thereto.

Moreover, as used herein, the terms "relay UE," "relay UE candidate," "potential relay UE candidate," or similar terms can be used interchangeably to refer to a UE that may function as a relay UE over at least SL between at least a remote UE and at least a serving network.

As used herein, a "computer-readable storage medium," which refers to a non-transitory physical storage medium (e.g., volatile or non-volatile memory device), can be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc (BD), the like, or combinations thereof), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where certain embodiments are described to use a computer-readable storage medium, other types of computer-readable mediums can be substituted for or used in addition to the computer-readable storage medium in alternative embodiments.

In the following, certain embodiments are explained with reference to communication devices capable of communication via a wired and/or wireless network and communication systems serving such communication devices. Before explaining in detail certain example embodiments, certain general principles of a wired and/or wireless communication system, access systems thereof, and communication devices are briefly explained with reference to FIGS. 1-4 to assist in understanding the technology underlying the described examples.

According to some embodiments, a communication device or terminal can be provided for wireless access via cells, base stations, access points, the like (e.g., wireless transmitter and/or receiver nodes providing access points for a radio access communication system and/or other forms of wired and/or wireless networks), or combinations thereof. Such wired and/or wireless networks include, but are not limited to, networks configured to conform to 2G, 3G, 4G, LTE, 5G, and/or any other similar or yet to be developed future communication network standards. The present disclosure contemplates that any methods, apparatuses, computer program codes, and any portions or combination thereof can also be implemented with yet undeveloped communication networks and associated standards as would be developed in the future and understood by one skilled in the art in light of the present disclosure.

Access points and hence communications there through are typically controlled by at least one appropriate control apparatus so as to enable operation thereof and management of mobile communication devices in communication therewith. In some embodiments, a control apparatus for a node can be integrated with, coupled to, and/or otherwise provided for controlling the access points. In some embodiments, the control apparatus can be arranged to allow communications between a user equipment and a core network or a network entity of the core network. For this purpose, the control apparatus can comprise at least one memory, at least one data processing unit such as a processor or the like, and an input/output interface (e.g., global positioning system receiver/transmitter, keyboard, mouse, touchpad, display, universal serial bus (USB), Bluetooth, ethernet, wired/wireless connections, the like, or combinations thereof).

Moreover, via the interface, the control apparatus can be coupled to relevant other components of the access point. The control apparatus can be configured to execute an appropriate software code to provide the control functions. It shall be appreciated that similar components can be provided in a control apparatus provided elsewhere in the network system, for example in a core network entity. The control apparatus can be interconnected with other control entities. The control apparatus and functions can be distributed between several control units. In some embodiments, each base station can comprise a control apparatus. In alternative embodiments, two or more base stations can share a control apparatus.

Access points and associated controllers can communicate with each other via a fixed line connection and/or via a radio interface. The logical connection between the base station nodes can be provided for example by an X2 interface, an S1 interface, a similar interface, or combinations thereof. This interface can be used for example for coordination of operation of the stations and performing reselection or handover operations. The logical communication connection between the initial communication node and the final communication node of the network can comprise a plurality of intermediary nodes. Additionally, any of the nodes can be added to and removed from the logical communication connection as required to establish and maintain a network function communication.

The communication device or user equipment can comprise any suitable device capable of at least receiving a communication signal comprising data. The communication signal can be transmitted via a wired connection, a wireless connection, or combinations thereof. For example, the device can be a handheld data processing device equipped with radio receiver, data processing and user interface apparatus. Non-limiting examples include a mobile station (MS) such as a mobile phone or what is known as a 'smart phone,' a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, earpieces with wireless connectivity, jewelry and so on, Universal Serial Bus (USB) sticks with wireless capabilities, modem data cards, machine type devices or any combinations of these or the like.

In some embodiments, a communication device, e.g., configured for communication with the wireless network or a core network entity, can be exemplified by a handheld or otherwise mobile communication device or user equipment. A mobile communication device can be provided with wireless communication capabilities and appropriate electronic control apparatus for enabling operation thereof. Thus, the communication device can be provided with at least one data processing entity, for example a central processing unit and/or a core processor, at least one memory and other possible components such as additional processors and memories for use in software and hardware aided execution of tasks it is designed to perform. The data processing, storage, and other relevant control apparatus can be provided on an appropriate circuit board and/or in chipsets.

Data processing and memory functions provided by the control apparatus of the communication device are configured to cause control and signaling operations in accordance with certain embodiments as described later in this description. A user can control the operation of the communication device by means of a suitable user interface such as touch sensitive display screen or pad and/or a keypad, one of more actuator buttons, voice commands, combinations of these, or the like. A speaker and a microphone are also typically provided. Furthermore, a mobile communication device can comprise appropriate connectors (either wired or wireless) to other devices and/or for connecting external accessories, for example hands-free equipment, thereto.

In some embodiments, a communication device can communicate wirelessly via one or more appropriate apparatuses for receiving and transmitting signals (e.g., global positioning system receiver/transmitter, remote touchpad interface with remote display, Wi-Fi interface, etc.). In some embodiments, a radio unit can be connected to the control apparatus of the device. The radio unit can comprise a radio part and associated antenna arrangement. The antenna arrangement can be arranged internally or externally to the communication device.

FIGS. 1-3 illustrate various example architectures for a communications network 100 in which the various methods, apparatuses, and computer program products can be carried out and/or used. In some embodiments, the communications network 100 can comprise any suitable configuration, number, orientation, positioning, and/or dimensions of components and specialized equipment configured to provide an air interface (e.g., New Radio (NR)) for communication or connection between a User Equipment 102 (UE 102) and a Data Network 116 (DN 116) via a Core Network 101 (CN 101) of the communications network 100. The UE 102 can be associated with one or more devices associated with one or more network function (NF) service consumers.

As illustrated in FIG. 1, a communications network 100 can be provided in which the UE 102 is in operable communication with the Radio Access Network 104 (RAN 104), such as by way of a transmission tower, a base station, an access point, a network node, and/or the like. In some embodiments, the RAN 104 can communicate with the CN 101 or a component or entity thereof. In some embodiments, the CN 101 can facilitate communication between the UE 102 and the DN 116, such as for sending data, messages, requests, the like, or combinations thereof. In some embodiments, the DN 116 or the CN 101 can be in communication with an Application Server or Application Function 112 (AS/AF 112). The RAN 104, CN 101, DN 116, and/or AS/AF 112 can be associated with a Network Repository Function (NRF), NF service producer, Service Communication Proxy (SCP), Security Edge Protection Proxy (SEPP), Policy Charging Function (PCF), the like, or combinations thereof.

In the context of, for example, a 5G network, such as illustrated in FIGS. 2 and 3, the communications network 100 can comprise a series of connected network devices and specialized hardware that is distributed throughout a service region, state, province, city, or country, and one or more network entities, which can be stored at and/or hosted by one or more of the connected network devices or specialized hardware. In some embodiments, the UE 102 can connect to the RAN 104, which can then relay the communications between the UE 102 and the CN 101, the CN 101 being connected to the DN 116, which can be in communication with one or more AS/AF 112.

In some embodiments, the UE 102 can be in communication with a RAN 104, which can act as a relay between the UE 102 and other components or services of the CN 101. For instance, in some embodiments, the UE 102 can communicate with the RAN 104, which can in turn communicate with an Access and Mobility Management Function 108 (AMF 108). In other instances or embodiments, the UE 102 can communicate directly with the AMF 108. In some embodiments, the AMF 108 can be in communication with one or more network functions (NFs), such as an Authentication Server Function 120 (AUSF 120), a Network Slice Selection Function 122 (NSSF 122), a Network Repository Function 124 (NRF 124), a Policy Charging Function 114 (PCF 114), a Unified Data Management function 118 (UDM 118), the AS/AF 112, a Session Management Function 110 (SMF 110), and/or the like.

In some embodiments, the SMF 110 can be in communication with one or more User Plane Functions 106 (UPF 106, UPF 106a, UPF 106b, collectively "UPF 106"). By way of example, in some embodiments, the UPF 106 can be in communication with the RAN 104 and the DN 116. In other embodiments, the DN 116 can be in communication with a first UPF 106a and the RAN 104 can be in communication with a second UPF 106b, while the SMF 110 is in communication with both the first and second UPFs 106a, b and the first and second UPFs 106a, b are in communication each with the other.

In some embodiments, the UE 102 can comprise a single-mode or a dual-mode device such that the UE 102 can be connected to one or more RANs 104. In some embodiments, the RAN 104 can be configured to implement one or more Radio Access Technologies (RATs), such as Bluetooth, Wi-Fi, and Global System for Mobile Communication (GSM), Universal Mobile Telecommunications System (UMTS), LTE or 5G NR, among others, that can be used to connect the UE 102 to the CN 101. In some embodiments, the RAN 104 can comprise or be implemented using a chip, such as a silicon chip, in the UE 102 that can be paired with or otherwise recognized by a similar chip in the CN 101, such that the RAN 104 can establish a connection or line of communication between the UE 102 and the CN 101 by identifying and pairing the chip within the UE 102 with the chip within the CN 101. In some embodiments, the RAN 104 can implement one or more base stations, towers or the like to communicate between the UE 102 and the AMF 108 of the CN 101.

In some embodiments, the communications network 100 or components thereof (e.g., base stations, towers, etc.) can be configured to communicate with a communication device (e.g., the UE 102) such as a cell phone or the like over multiple different frequency bands, e.g., FR1 (below 6 GHz), FR2 (mm Wave), other suitable frequency bands, sub-bands thereof, and/or the like. In some embodiments, the communications network 100 can comprise or employ massive Multiple Input and Multiple Output (MIMO) antennas. In some embodiments, the communications network 100 can comprise Multi-User MIMO (MU-MIMO) antennas. In some embodiments, the communications network 100 can employ edge computing whereby the computing servers are communicatively, physically, computationally, and/or temporally closer to the communications device (e.g., UE 102) in order to reduce latency and data traffic congestion. In some embodiments, the communications network 100 can employ other technologies, devices, or techniques, such as small cell, low-powered RAN, beamforming of radio waves, Wi-Fi cellular convergence, Non-Orthogonal Multiple Access (NOMA), channel coding, the like, or combinations thereof.

As illustrated in FIG. 3, the UE 102 can be configured to communicate with the RAN 104 in a N1 interface, e.g., according to a Non-Access Stratum (NAS) protocol. In some embodiments, RAN 104 can be configured to communicate with the CN 101 or a component thereof (e.g., the AMF 108) in a N2 interface, e.g., in a control plane between a base station of the RAN 104 and the AMF 108. In some embodiments, the RAN 104 can be configured to communicate with the UPF 106 in an N3 interface, e.g., in a user plane. In some embodiments, the AMF 108 and/or the SMF 110 can be configured to communicate with other services or network entities within the CN 101 in various different interfaces and/or according to various different protocols. For instance, in some embodiments, the AMF 108 and/or the SMF 110 can be configured to communicate with the AUSF 120 in an Nausf interface or an N12 interface.

In some embodiments, the AMF 108 and/or the SMF 110 can be configured to communicate with the NSSF 122 in an Nnssf interface. In some embodiments, the AMF 108 and/or the SMF 110 can be configured to communicate with the NRF 124 in an Nnrf interface. In some embodiments, the AMF 108 and/or the SMF 110 can be configured to communicate with the PCF 114 in an Npcf interface or an N7 interface. In some embodiments, the AMF 108 and/or the SMF 110 can be configured to communicate with the NWDAF 126 in an Nnwdaf interface. In some embodiments, the AMF 108 and/or the SMF 110 can be configured to communicate with the UDM 118 in an Nudm interface, an N8 interface, or an N10 interface. In some embodiments, the AMF 108 and/or the SMF 110 can be configured to communicate with the AS/AF 112 in an Naf interface. In some embodiments, the SMF 110 can be configured to communicate with the UPF 106 in an N4 interface, which can act as a bridge between the control plane and the user plane, such as acting as a conduit for a Protocol Data Unit (PDU) session during which information is transmitted between, e.g., the UE 102 and the CN 101 or components/services thereof.

It will be appreciated that certain example embodiments described herein arise in the context of a telecommunications network, including but not limited to a telecommunications network that conforms to and/or otherwise incorporates aspects of a fifth-generation (5G) architecture. While FIGS. 1-3 illustrate various configurations and/or components of an example architecture of the communications network 100, many other systems, system configurations, networks, network entities, and pathways/protocols for communication therein are contemplated and considered within the scope of this present disclosure.

While the methods, devices/apparatuses, and computer program products/codes described herein are described within the context of a fifth-generation core network (5GC) and system, such as illustrated in FIGS. 1-3 and described hereinabove, the described methods, devices, and computer program products can nevertheless be applied in a broader context within any suitable telecommunications system, network, standard, and/or protocol. It will be appreciated that the described methods, devices, and computer program products can further be applied to yet undeveloped future networks and systems as would be apparent to one skilled in the art in light of the present disclosure.

Turning now to FIG. 4, examples of an apparatus that may be embodied by the user equipment or by a network entity, such as server or other computing device are depicted in accordance with an example embodiment of the present disclosure. As described below in conjunction with the flowcharts and block diagrams presented herein, the apparatus 200 of an example embodiment can be configured to perform the functions described herein. In any instance, the apparatus 200 can more generally be embodied by a computing device, such as a server, a personal computer, a computer workstation or other type of computing device including those functioning as a user equipment and/or a component of a wireless network or a wireless local area network. Regardless of the manner in which the apparatus 200 is embodied, the apparatus of an example embodiment can be configured as shown in FIG. 4 so as to include, be associated with or otherwise be in communication with a processor 202 and a memory device 204 and, in some embodiments, and/or a communication interface 206.

Although not illustrated, the apparatus of an example embodiment may also optionally include a user interface, such as a touch screen, a display, a keypad, the like, or combinations thereof. Moreover, the apparatus according to an example embodiment can be configured with a global positioning circuit that comprises a global positioning receiver and/or global positioning transmitter configured for communication with one or more global navigation satellite systems (e.g., GPS, GLONASS, Galileo, the like, or combinations thereof). The global positioning circuit may be configured for the transmission and/or receipt of direct/indirect satellite and/or cell signals in order to determine geolocation data (e.g., latitude, longitude, elevation, altitude, geographic coordinates, the like, or combinations thereof) for the apparatus and/or another communication device associated with the apparatus or the one or more global navigation satellite systems. In some embodiments, geolocation data may comprise a time dimension, such as a time stamp that associates the geolocation data with a respective time (e.g., 01:00 AM EST, etc.), a respective date (e.g., Sep. 26, 2020, etc.), and/or the like. The time dimension may be configured based on one or more of a time of receipt, generation, transmission, and/or the like (e.g., by the apparatus). In some embodiments, geolocation data may be associated with one or more time dimensions.

The processor 202 (and/or co-processors or any other circuitry assisting or otherwise associated with the processor) can be in communication with the memory device 204 via a bus for passing information among components of the apparatus 200. The memory device can include, for example, one or more volatile and/or non-volatile memories, such as a non-transitory memory device. In other words, for example, the memory device can be an electronic storage device (e.g., a computer readable storage medium) comprising gates configured to store data (e.g., bits) that can be retrievable by a machine (e.g., a computing device like the processor). The memory device can be configured to store information, data, content, applications, instructions, the like, or combinations thereof for enabling the apparatus to carry out various functions in accordance with an example embodiment. For example, the memory device could be configured to buffer input data for processing by the processor. Additionally or alternatively, the memory device could be configured to store instructions for execution by the processor.

The apparatus 200 can, in some embodiments, be embodied in various computing devices as described above. However, in some embodiments, the apparatus can be embodied as a chip or chip set. In other words, the apparatus can comprise one or more physical packages (e.g., chips) including materials, components and/or wires on a structural assembly (e.g., a baseboard). The structural assembly can provide physical strength, conservation of size, and/or limitation of electrical interaction for component circuitry included thereon. The apparatus can therefore, in some cases, be configured to implement an embodiment of the present disclosure on a single chip or as a single "system on a chip." As such, in some cases, a chip or chipset can constitute means for performing one or more operations for providing the functionalities described herein.

The processor 202 can be embodied in a number of different ways. For example, the processor can be embodied as one or more of various hardware processing means such as a coprocessor, a microprocessor, a controller, a Digital Signal Processor (DSP), a processing element with or without an accompanying DSP, or various other circuitry including integrated circuits such as, for example, an Application Specific Integrated Circuit (ASIC), a Field Programmable Gate Array (FPGA), a Micro-Controller Unit (MCU), a hardware accelerator, a special-purpose computer chip, or the like. As such, in some embodiments, the processor can include one or more processing cores configured to perform independently. A multi-core processor can enable multiprocessing within a single physical package. Additionally or alternatively, the processor can include one or more processors configured in tandem via the bus to enable independent execution of instructions, pipelining and/or multithreading.

In an example embodiment, the processor 202 can be configured to execute instructions stored in the memory device 204 or otherwise accessible to the processor. Alternatively or additionally, the processor can be configured to execute hard coded functionality. As such, whether configured by hardware or software methods, or by a combination thereof, the processor can represent an entity (e.g., physically embodied in circuitry) capable of performing operations according to an embodiment of the present disclosure while configured accordingly. Thus, for example, when the processor is embodied as an ASIC, FPGA, the like, or combinations thereof the processor can be specifically configured hardware for conducting the operations described herein. Alternatively, as another example, when the processor is embodied as an executor of instructions, the instructions can specifically configure the processor to perform the algorithms and/or operations described herein when the instructions are executed. However, in some cases, the processor can be a processor of a specific device (e.g., an encoder and/or a decoder) configured to employ an embodiment of the present disclosure by further configuration of the processor by instructions for performing the algorithms and/or operations described herein. The processor can include, among other things, a clock, an Arithmetic Logic Unit (ALU) and logic gates configured to support operation of the processor.

In some embodiments that include a communication interface 206, the communication interface can be any means such as a device or circuitry embodied in either hardware or a combination of hardware and software that is configured to receive and/or transmit data from/to a network and/or any other device or module in communication with the apparatus 200, such as network functions, network repository functions, a base station, an access point, service communication proxies, UE 102, RAN 104, core network services, AS/AF 112, a database or other storage device, the like, or combinations thereof. In this regard, the communication interface can include, for example, one or more antennas and supporting hardware and/or software for enabling communications with a wireless communication network. Additionally or alternatively, the communication interface can include the circuitry for interacting with the one or more antennas to cause transmission of signals via the one or more antennas or to handle receipt of signals received via the one or more antennas.

In some embodiments, the one or more antennas may comprise one or more of a dipole antenna, monopole antenna, helix antenna, loop antenna, waveguide, horn antenna, parabolic reflectors, corner reflectors, dishes, micro strip patch array, convex-plane, concave-plane, convex-convex, concave-concave lenses, the like or combinations thereof. In some environments, the communication interface can alternatively or also support wired communication. As such, for example, the communication interface can include a communication modem and/or other hardware/software for supporting communication via cable, Digital Subscriber Line (DSL), USB, the like or combinations thereof.

In some embodiments, a session management function (e.g., SMF 110) can comprise a 5GC session management function for any suitable Control and User Plane Separation (CUPS) architecture, such as for the General Packet Radio Service (GPRS), Gateway GPRS Support Node Control plane function (GGSN-C), Trusted Wireless Access Gateway Control plane function (TWAG-C), Broadband Network Gateway Control and User Plane Separation (BNG-CUPS), N4 interface, Sxa interface, Sxb interface, Sxc interface, Evolved Packet Core (EPC) Serving Gateway Control plane function (SGW-C), EPC Packet Data Network Gateway Control plane function (PGW-C), EPC Traffic Detection Control plane function (TDF-C), the like, or combinations thereof.

As illustrated, the apparatus 200 can include a processor 202 in communication with a memory 204 and configured to provide signals to and receive signals from a communication interface 206. In some embodiments, the communication interface 206 can include a transmitter and a receiver. In some embodiments, the processor 202 can be configured to control the functioning of the apparatus 200, at least in part. In some embodiments, the processor 202 can be configured to control the functioning of the transmitter and receiver by effecting control signaling via electrical leads to the transmitter and receiver. Likewise, the processor 202 can be configured to control other elements of apparatus 200 by effecting control signaling via electrical leads connecting the processor 202 to the other elements, such as a display or the memory 204.

The apparatus 200 can be capable of operating with one or more air interface standards, communication protocols, modulation types, access types, and/or the like. Signals sent and received by the processor 202 can include signaling information in accordance with an air interface standard of an applicable cellular system, and/or any number of different wireline or wireless networking techniques, comprising but not limited to Wi-Fi, Wireless Local Access Network (WLAN) techniques, such as Institute of Electrical and Electronics Engineers (IEEE) 802.11, 802.16, 802.3, Asymmetric Digital Subscriber Line (ADSL), Data Over Cable Service Interface Specification (DOCSIS), the like, or combinations thereof. In addition, these signals can include speech data, user generated data, user requested data, the like, or combinations thereof.

For example, the apparatus 200 and/or a cellular modem therein can be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, Session Initiation Protocol (SIP)), the like, or combinations thereof. For example, the apparatus 200 can be capable of operating in accordance with 2G wireless communication protocols Interim Standard (IS) 136 (IS-136), Time Division Multiple Access (TDMA), GSM, IS-95, Code Division Multiple Access, Code Division Multiple Access (CDMA), the like, or combinations thereof. In addition, for example, the apparatus 200 can be capable of operating in accordance with 2.5G wireless communication protocols GPRS, Enhanced Data GSM Environment (EDGE), the like, or combinations thereof.

Further, for example, the apparatus 200 can be capable of operating in accordance with 3G wireless communication protocols, such as UMTS, Code Division Multiple Access 2000 (CDMA2000), Wideband Code Division Multiple Access (WCDMA), Time Division-Synchronous Code Division Multiple Access (TD-SCDMA), the like, or combinations thereof. The NA 200 can be additionally capable of operating in accordance with 3.9G wireless communication protocols, such as Long Term Evolution (LTE), Evolved Universal Terrestrial Radio Access Network (E-UTRAN), the like, or combinations thereof.

Additionally, for example, the apparatus 200 can be capable of operating in accordance with 4G wireless communication protocols, such as LTE Advanced, 5G, and/or the like as well as similar wireless communication protocols that can be subsequently developed. In some embodiments, the apparatus 200 can be capable of operating according to or within the framework of any suitable CUPS architecture, such as for the gateway GGSN-C, TWAG-C, Broadband Network Gateways (BNGs), N4 interface, Sxa interface, Sxb interface, Sxc interface, EPC SGW-C, EPC PGW-C, EPC TDF-C, the like, or combinations thereof. Indeed, although described herein in conjunction with operation with a 5G system, the apparatus and method may be configured to operate in conjunction with a number of other types of systems including systems hereinafter developed and implemented.

Some of the example embodiments disclosed herein can be implemented in software, hardware, application logic, or a combination of software, hardware, and application logic. The software, application logic, and/or hardware can reside on memory 204, the processor 202, or electronic components, for example. In some example embodiments, the application logic, software or an instruction set is maintained on any one of various conventional computer-readable media. In the context of this document, a "computer-readable medium" can be any non-transitory media that can contain, store, communicate, propagate or transport the instructions for use by or in connection with an instruction execution system, apparatus, or device, such as a computer or data processor circuitry, with examples depicted at FIG. 4. The computer-readable medium can comprise a non-transitory computer-readable storage medium that can be any media that can contain or store the instructions for use by or in connection with an instruction execution system, apparatus, or device, such as a computer.

FIG. 5 illustrates an example communication network 500 that comprises Remote UE 502, a plurality of relay UEs, RAN 506, and CN 508. The Remote UE 502 is out of range of RAN 506 but may utilize one or more relay UEs of the plurality of relay UEs via SL and network connections thereof to communicably connect to RAN 506 or to CN 508 or to one or more other networks (not shown). As illustrated the plurality of relay UEs comprises Relay UE #1 504A, Relay UE #2 504B, and Relay UE #3 504C. In some embodiments, the plurality of relay UEs may comprise one or more additional relay UEs (not shown). The Remote UE 502 utilizes at least Communication Interface 206 to establish one or more connections by way of causing transmission of, and receiving, communication signals between the Remote UE 502 via SL and at least one relay UE of the plurality of relay UEs.

In some embodiments, Remote UE 502 can connect to a plurality of public and/or private networks and/or a plurality of public and/or private network slices, directly or indirectly, by way of Communication Interface 206. In some embodiments, Relay UE #1 504A, Relay UE #2 504B, Relay UE #3 504C, or the like can connect to a plurality of public and/or private networks and/or a plurality of public and/or private network slices by way of their respective communication interface(s) (e.g., Communication Interface 206). In some embodiments, a respective communication interface associated with Relay UE #1 504A, Relay UE #2 504B, Relay UE #3 504C, or the like may be communicably connected to a RAN, a cell, a gNB, a ng-eNB, a NodeB, the like, or combinations thereof such that communication signals can be transmitted and received therethrough. In some embodiments, one or more relay UEs may be communicably connected to one or more other relay UEs, and/or Remote UE 502, via SL. In some embodiments, Communication Interface 206 may be configured to support SL communications with an SL-capable gNB and/or a plurality of UEs.

As shown in FIG. 5, Relay UE #1 504A, Relay UE #2 504B, and/or Relay UE #3 504C may be in communication with RAN 506. The RAN 506, as illustrated, comprises gNB #1 506A and gNB#2 506B. In some embodiments, RAN 506 may comprise a plurality of additional RAN nodes (e.g., ng-eNB(s), NodeB(s), and/or the like). In some embodiments, Relay UE #1 504A, Relay UE #2 504B, Relay UE #3 504C, or the like may be communicably connected, via RAN 506, to different networks or network slices. For example, Relay UE #1 504A may be connected to a first network (not shown) via gNB #1 506A and Relay UE #3 504C may be connected to a second network (not shown) via gNB #2 506B.

In some embodiments, access to one or more networks and/or network slices may be controlled by a network function. For example, access to the network associated with CN 508 may be controlled by AMF 108 or similar network functions. In some embodiments, RAN 506, gNB #1 506A, gNB #2 506B, or the like may be shared by a plurality of networks (not shown). For example, gNB #1 506A may serve at least a first network and a second network while gNB #2 506B may serve at least the first network and a third network. In some embodiments, Remote UE 502 may connect via SL to a respective relay UE to establish communications with a respective network, via a respective RAN node. In some embodiments, the Remote UE 502 is out of communicable range with the RAN 506 (e.g., gNB #1 506A, gNB #2 506B, or the like). In such embodiments, the Remote UE 502 is within communicable range of Relay UE #1 504A, Relay UE #2 504B, Relay UE #3 504C and/or the like. Moreover, Relay UE #1 504A, Relay UE #2 504B, and/or Relay UE #3 504C are within communicable range of the RAN 506 or a portion thereof. In such embodiments, Relay UE #1 504A, Relay UE #2 504B, Relay UE #3 504C and/or the like may be configured to relay communication signals between the Remote UE 502 and the serving network, via the RAN 506. It should be appreciated, in light of the present disclosure, that the relay UE(s) effectively extend(s) the communicable range between the Remote UE 502 and the serving network (e.g., the RAN 506, or the like).

FIG. 6 illustrates a flow chart that depicts an example signal sequence 600, for the provision of service-continuity during path switch for SL based U2N relay, between communication devices. Example signal sequence 600 is, at least partially, facilitated by way of a network infrastructure (e.g., communications network 100, 500, or the like) and/or one or more communication interfaces (e.g., Communication Interface 206, or the like). As shown, the example network infrastructure utilized for signal sequence 600 comprises at least Remote UE 602, Relay UE #1 604A, Relay UE #2 604B, Relay UE #3 604C, gNB #1 606A, and gNB #2 606B. In some embodiments, the network infrastructure may be configured in accordance with 5G system standards, or the like (e.g., 4G, LTE, etc.). In some embodiments, the network infrastructure may be configured with one or more RANs (e.g., associated with gNB #1 606A and/or gNB #2 606B) that can comprise one or more 5G radio nodes, such as one or more additional gNBs (not shown) or the like. In some embodiments, the example signal sequence 600 may be implemented utilizing one or more network infrastructures associated with one or more networks (e.g., a PLMN, an SNPN, etc.) via at least a shared RAN. In some embodiments, each of the one or more networks may comprise one or more network slices.

FIG. 6 illustrates at block 608 that Remote UE 602, Relay UE #1 604A, Relay UE #2 604B, and Relay UE #3 604C are configured for U2N relay with service-continuity support. Remote UE 602, as illustrated at block 610, has either ongoing service via U2N relay or direct cellular access to gNB #1 606A. For example, Remote UE 602 may have ongoing service via U2N relay with Relay UE #1 604A and gNB #1 606A to a serving network (not shown). Relay UE #1 604A is in the RRC_CONNECTED state to gNB #1 606A, see block 612. Additionally, Relay UE #2 604B is in the RRC_IDLE state while also being camped on gNB #1 606A, see block 614. Relay UE #3 604C is in the RRC_CONNECTED state to gNB #2 606B, as shown in block 616.

Block 618 illustrates that Remote UE 602 makes a determination that there is a need for relay discovery and selection/reselection for service-continuity with a possible path switch due to one or more triggers or criteria. For example, Remote UE 602 may determine that there is a need for relay discovery and reselection for service-continuity with a possible path switch due to a loss of coverage with a current U2N path configuration. In response to determining that there is a need for relay discovery and selection/reselection for service-continuity with a possible path switch, Remote UE 602 causes transmission of a solicitation message for relay discovery with a service-continuity indication over SL, see block 620. The Remote UE 602 causes transmission of the solicitation message to at least Relay UE #1 604A, Relay UE #2 604B, and Relay UE #3 604C.

In response to receipt of the solicitation message, Relay UE #1 604A makes a determination to respond to the Remote UE 602 directly to be a relay UE candidate for the Remote UE 602, see block 622. In response to receipt of the solicitation message, Relay UE #2 604B makes a determination to report the Remote UE 602 and the solicitation message to the serving network and consult with the serving network on how to handle responding to Remote UE 602, see block 624. Similarly, Relay UE #3 604C in response to receipt of the solicitation message, also makes a determination to report the Remote UE 602 and the solicitation message to its respective serving network and consult with its respective serving network on how to handle responding to Remote UE 602, see block 626. In some embodiments, Relay UE #1 604A, Relay UE #2 604B and Relay UE #3 604C may be associated with the same or different serving networks.

Block 628 illustrates that Relay UE #1 604A causes transmission of a response message over SL to Remote UE 602. As shown, Relay UE #1 604A responds directly to Remote UE 602 over SL and the response message indicates to Remote UE 602 that Relay UE #1 604A will be a relay UE candidate for the Remote UE 602. Relay UE #2 604B initiates setting up an RRC connection to gNB #1 606A, thereby switching from RRC_IDLE to RRC_CONNECTED with respect to gNB #1 606A, before reporting the Remote UE 602 and the solicitation message to the serving network and consulting with the serving network on how to respond, see block 630. After setting up the RRC connection to gNB #1 606A, the Relay UE #2 604B causes transmission of a reporting message comprising information identifying the Remote UE 602 and the solicitation message associated therewith to gNB #1 606A, see block 632. Additionally, the Relay UE #3 604C, which is RRC_CONNECTED to gNB #2 606B, causes transmission of a reporting message comprising information identifying the Remote UE 602 and the solicitation message associated therewith to gNB #2 606B, see block 634.

At block 636, gNB #2 606B selects Relay UE #3 604C to be a relay UE candidate for Remote UE 602 based on at least the reporting message received. At block 638, gNB #2 606B causes transmission of a notification message that notifies gNB #1 606A that Relay UE #3 604C may serve as a relay UE candidate for the Remote UE 602. In some embodiments, gNB #2 606B may select a plurality of potential relay UE candidates based on one or more received reporting messages and in response cause transmission of a notification to gNB #1 606A identifying the plurality of potential relay UE candidates. Moreover, gNB #2 606B further causes transmission of a relay configuration message to the Relay UE #3 604C, see block 640. The relay configuration message, provided by the gNB #2 606B to the Relay UE #3 604C, may comprise control information specifying response message instructions as to whether to respond, what to identify in the response, and how to respond to the solicitation message of the Remote UE 602. In some embodiments, the relay configuration message may further comprise an identification of one or more relay UE candidates. The Relay UE #3 604C, based on the relay configuration message provided by the gNB #2 606B, determines to be a relay UE candidate without a need to send a response to the Remote UE 602, see block 642.

At block 644, the gNB #1 606A selects Relay UE #2 604B to be a relay UE candidate for Remote UE 602 based on at least the reporting message received. The gNB #1 606A further causes transmission of a relay configuration message to the Relay UE #2 604B, the relay configuration message comprises at least an identification of one or more relay UE candidates, see block 646. As further shown in block 646, the Relay UE #2 604B and the Relay UE #3 604C are provided in the relay configuration message as potential relay UE candidates. The relay configuration message, provided by the gNB #1 606A to the Relay UE #2 604B, may comprise control information specifying response message instructions as to whether to respond, what to identify in the response, and how to respond to the solicitation message received from the Remote UE 602.

Additionally, at block 648, the gNB #1 606A may provide a remote configuration message directly to the Remote UE 602. For example, the gNB #1 606A may cause transmission of a remote configuration message directly to the Remote UE 602 via a direct cellular access connection. As further shown in block 648, the remote configuration message to the Remote UE 602 comprises at least an identification of the Relay UE #2 604B and the Relay UE #3 604C as relay UE candidates. In some embodiments, the remote configuration message may comprise a list of all relay UE candidates known to the RAN associated with the gNB.

At block 650, Relay UE #2 604B determines, based on at least the relay configuration message received from the gNB #1 606A, to be a relay UE candidate for Remote UE 602 and to send a response message to the Remote UE 602 responding to the solicitation message received from the Remote UE 602. In some embodiments, the response message provided by the Relay UE #2 604B to the Remote UE 602 is generated based on at least the relay configuration message (e.g., response message instructions, etc.) provided by the gNB #1 606A. At block 652, the Relay UE #2 604B causes transmission of the response message to Remote UE 602 over the SL therebetween. Block 652 further shows that the response message provided from UE #2 604B to Remote UE 602 comprises at least a list of relay UE candidates identifying one or more relay UE candidates available for SL connections to the RAN (e.g., gNB #1 606A and/or gNB #2 606B, or the like).

FIG. 7 illustrates a flowchart of the operations of an example method 700 performed by an example apparatus 200 which, in some embodiments, may be embodied by a remote UE (e.g., 502, 602, etc.), or the like, which, in turn, may include a computer program product comprising a non-transitory computer readable medium storing computer program code executed by, for example, processor 202. As shown in block 702, apparatus 200 of this example embodiment includes means, such as the processor 202, the memory 204, the communication interface 206 or the like, for causing transmission (e.g., by a remote UE) of a solicitation message for relay discovery over SL and the solicitation message may comprise a service-continuity indication. For example, a remote UE may determine that it is Out of Coverage (OoC) range of a its serving network and in response the remote UE broadcasts a solicitation message including at least a service-continuity indication to any nearby relay UEs that are within the remote UEs communicable broadcast range.

As shown in block 704, apparatus 200 of this example embodiment includes means, such as the processor 202, the memory 204, the communication interface 206 or the like, for receiving (e.g., by the remote UE) one or more response messages from one or more potential relay UE candidates over SL. The apparatus 200 may be further configured for further receiving a remote configuration from a serving network (e.g., directly or via SL) and the one or more response messages or the remote configuration may identify the one or more potential relay UE candidates. Moreover, the remote UE may prioritize the one or more potential relay UE candidates that are identified.

FIG. 8 illustrates a flowchart of the operations of an example method 800 performed by an example apparatus 200 which, in some embodiments, may be embodied by a relay UE (e.g., 504A-C, 604A-C, etc.), or the like, which, in turn, may include a computer program product comprising a non-transitory computer readable medium storing computer program code executed by, for example, processor 202. As shown in block 802, apparatus 200 of this example embodiment includes means, such as the processor 202, the memory 204, the communication interface 206 or the like, for receiving (e.g., by a relay UE) a solicitation message for relay discovery from a remote UE over SL and the solicitation message may comprise a service-continuity indication. The example apparatus 200, as shown in block 804, may further be configured for determining, based on a first set of criteria, that the relay UE may serve as a relay UE candidate for the remote UE. As shown in block 806, apparatus 200 may include means for determining, based on a second set of criteria, that the relay user equipment is to report information relating to the remote user equipment to a serving network (e.g., the received solicitation message with service-continuity indication). Such a determination may cause transmission, by apparatus 200 for example via a network connection, of a reporting message (e.g., including at least information associated with the remote UE and its request) to the serving network, as further shown in block 808. As shown in block 810, apparatus 200 of this example embodiment includes means, such as the processor 202, the memory 204, the communication interface 206 or the like, for receiving, via the network connection, a relay configuration from the serving network.

FIG. 9 illustrates a flowchart of the operations of an example method 900 performed by an example apparatus 200 which, in some embodiments, may be embodied by one or more Network Entities (e.g., gNB 606A-B, gNB 506A-B, a server hosting a core network, a computing device hosting a network function, etc.), or the like, which, in turn, may include a computer program product comprising a non-transitory computer readable medium storing computer program code executed by, for example, processor 202. As shown in block 902, apparatus 200 of this example embodiment includes means, such as the processor 202, the memory 204, the communication interface 206 or the like, for receiving, via at least one radio access network node associated with a serving network, one or more reporting messages from one or more relay user equipment. At block 904, the example apparatus (e.g., a network entity), includes means for selecting, from among the one or more relay user equipment, one or more potential relay user equipment candidates for a remote user equipment. Moreover, illustrated example embodiment includes means, such as the processor 202, the memory 204, the communication interface 206 or the like, for causing transmission, via the at least one radio access network node, of a relay configuration to at least one potential relay user equipment candidate of the one or more potential relay user equipment candidates, as shown at block 906.

It should be appreciated, in light of the present disclosure, that the service-continuity indication message, as described herein with respect to various embodiments, may be provided by the remote UE to one or more RAN nodes (e.g., gNBs, etc.) via a plurality of transmission methods (e.g., broadcast, independent communication channels, etc.). In some embodiments, the service-continuity indication generated by a remote UE may be included in the solicitation message sent/transmitted/broadcast by the remote UE to one or more of a relay UE, or the like. In some embodiments, the service-continuity indication generated by a remote UE may be included in, and/or transmitted via, the Sidelink Control Information (SCI) that is used for scheduling the Sidelink (SL) transmission of the solicitation message. In some embodiments, the service-continuity indication generated by a remote UE may be included in, and/or transmitted via, a Medium Access Control (MAC) protocol specification Control Element (CE) (e.g., a dedicated MAC CE configured for service-continuity indications) that may be sent/transmitted along with the solicitation message (e.g., separate from, or included in, the solicitation message, etc.). In some embodiments, the service-continuity indication generated by a remote UE may be sent via an exclusive SL logical channel with the solicitation message during broadcast of the solicitation message. In some embodiments, the service-continuity indication generated by a remote UE may be included in, and/or transmitted via, one or more of the MAC CE, a radio resource control signaling message, an information element in the solicitation message, or the like.

In some embodiments, the service-continuity indication may further comprise additional UE assistance information associated with the remote UE. In some embodiments, the additional UE assistance information may include without limitation information associated with the ongoing service of the remote UE (e.g., access mode, serving cell ID, serving relay ID, or the like), a service characteristic, a service requirement, a condition of the remote UE, a capability of the remote UE, a status of the remote UE, the like, or combinations thereof. In some embodiments, the additional UE assistance information may be used for decision making at the relay UE, RAN node, and/or serving network of the relay UE to respond to the solicitation message of the remote UE.

For example, with respect to FIG. 6, Relay UE #1 604A may utilize the additional UE assistance information at block 622 to determine to respond to the Remote UE 602 directly and to indicate that Relay UE #1 604A can be a relay UE candidate. As another example, with respect to FIG. 6, Relay UE #3 604C may utilize the additional UE assistance information at block 642 to determine to be a relay UE candidate. Moreover, with respect to FIG. 6, gNB #1 606A may utilize the additional UE assistance information at block 644 while selecting Relay UE #2 604B to be a relay UE candidate.

In some embodiments, the one or more triggers or criteria (e.g., a first/second set of predefined criteria, or the like) for sending, or causing transmission of, the solicitation message with the service-continuity indication by the remote UE may be configured to the remote UE or the relay UE using either common or dedicated signaling or pre-configuration (e.g., Out of Coverage (OoC) operation of the remote UE, etc.). In some embodiments, the one or more triggers or criteria for sending, or causing transmission of the response message by the relay UE may be configured to the remote UE or the relay UE using either common or dedicated signaling or pre-configuration (e.g., OoC operation of the remote UE, etc.). In some embodiments, the one or more triggers or criteria may be based on one or more of the remote UE measurement and reporting configurations or the relay UE measurement and reporting configurations. In some embodiments, the solicitation message may be a broadcast message and the remote UE may not know whether there are any relay UEs, or the like, in proximity of the remote UE (e.g., in a communicable range) to receive the broadcast message (e.g., via SL or the like). In some embodiments, the solicitation message may be one or more of a single transmission (e.g., a onetime broadcast), a periodic broadcast, or a continuous broadcast. For example, the solicitation message may comprise a onetime, periodic, or continuous broadcast transmission within a communicable range of the remote UE without a specific target recipient that may be received by one or more of relay UE. In some embodiments, the solicitation message may target one or more particular relay UEs. For example, the remote UE may transmit a targeted solicitation message to one or more known potential relay UE candidates.

In some embodiments, a relay UE that receives a solicitation message, from the remote UE, with a service-continuity indication may be configured to cause a transmission of a request to the serving network for authorization to serve as a relay UE candidate for the remote UE. The request message may comprise information about the remote UE, the parameters received from the remote UE, and measurement information (e.g., a signal quality, or the like). The parameters received from the remote UE may comprise one or more of a remote access mode, a serving cell identity, a serving relay identity, a service characteristic, a service requirement, a remote/relay UE capability, a remote/relay UE status, or the like. The measurement information may comprise one or more of a quality of service metric (e.g., signal strength, remaining battery time, etc.), an interface link quality (e.g., PC5 interface, etc.), a user equipment relay capability, a user equipment relay capacity, a quality of service class, a channel busy ratio, or the like. In some embodiments, the quality of service metric may be increasing or decreasing (e.g., an decreasing/increasing battery life due to usage/charging, an increasing/decreasing signal strength due to movement, etc.).

In some embodiments, the relay configuration, from the serving network to the relay UE, comprising instructions for responding to the remote UE may comprise an indication that the relay UE can serve as a relay UE candidate for the remote UE and that the relay UE does not need to send a response message to the remote UE. For example, the relay UE may be configured by the serving network to function as a relay UE candidate for the remote UE but the relay UE may not inform the remote UE of its status as a relay UE candidate because the remote UE may receive this information from another relay UE or from the serving network directly. It should be appreciated, in light of the present disclosure, that by authorizing a plurality of relay UEs to function as relay UE candidates to the remote UE and then transmitting a single, or reduced number of, response messages identifying all of the available relay UE candidates to the remote UE the serving network provides for improved RAN usage by reducing signal traffic through the RAN nodes.

In some embodiments, a request from a relay UE requesting authorization from the serving network to serve as a relay UE candidate for the remote UE may trigger the serving network to send paging messages to other UEs that can serve as relay UEs for the remote UE. In some embodiments, a paging message may be broadcast to one or more relay UEs within a communicable range of the RAN, or nodes thereof. In some embodiments, the paging message may be a plurality of paging messages directed to respectively identified relay UEs. In some embodiments, the paging message may be one or more of a single transmission (e.g., a onetime broadcast transmission), a periodic broadcast, or a continuous broadcast.

In some embodiments, a single transmission, a periodic broadcast, or a continuous broadcast may be directed to one or more network entities (e.g., a relay UE, a RAN node, etc.) based on one or more predefined criteria (e.g., a status mode, within a range, identified by an identifier, etc.). In some embodiments, a periodic broadcast and/or a continuous broadcast may be transmitted multiple times based on one or more predefined criteria (e.g., a set time, a number of intervals, etc.).

In some embodiments, the relay configuration from the serving network to the relay UE for responding to the remote UE may comprise a list, or an identification, of one or more relay UE candidates to be sent to the remote UE over SL by the relay UE. In some embodiments, the list of one or more relay UE candidates may be prioritized by the serving network and/or the relay UE based on one or more predefined criteria associated with the remote UE. In some embodiments, the list of one or more relay UE candidates may be prioritized by the remote UE (e.g., upon receipt from the relay UE, etc.).

In some embodiments, the relay configuration from the serving network to the relay UE for responding to the remote UE for providing a list of one or more relay UE candidates to the remote UE may comprise SL and/or UE-to-RAN Radio Interface (Uu) (e.g., relay UE to gNB radio interface, etc.) resource allocation for the relay UE or SL resource allocation for the remote UE. In some embodiments, the remote configuration from the serving network to the remote UE for providing a list and/or identification of one or more relay UE candidates to the remote UE may comprise SL and/or Uu resource allocation for the relay UE or SL resource allocation for the remote UE. In some embodiments, the inclusion of one or more resource allocation types in the relay and/or remote configuration(s) provides for at least meeting the resource service requirements for both the SL and for the Uu of the relay UE or for SL of the remote UE.

In some embodiments, the remote UE is configured to prioritize the one or more relay UE candidates identified by the serving network over the one or more relay UE candidates that respond to the remote UE over SL directly without first consulting with the serving network. For example, the remote UE may be configured (e.g., by the remote configuration, pre-configuration, etc.) to prioritize relay UE candidates from among the list of one or more relay UE candidates provided by the serving network of the remote UE. Moreover, the list of one or more relay UE candidates provided by the serving network of the remote UE may be prioritized over any relay UE candidates which responded to the remote UE over SL directly without consulting with the serving network of the relay UE. Further, the list of one or more relay UE candidates provided by the serving network of the remote UE may be prioritized over any relay UE candidate which is associated with a different serving network than that of the remote UE. For example, the remote UE may select a first relay UE candidate identified by the remote UE's serving network instead of selecting a second relay UE candidate that responded over SL directly and/or is associated with a serving network other than the remote UE's serving network.

In some embodiments, the relay configuration of one or more relay UE candidates may comprise UE assistance information for each of the one or more relay UE candidates and/or of the responding relay UE candidate. In some embodiments, the response message from a relay UE candidate to the remote UE may comprise UE assistance information for each of the one or more relay UE candidates and/or of the responding relay UE candidate. In some embodiments, the UE assistance information (e.g., for each of the one or more potential relay UE candidates, the responding relay UE candidate, the remote UE, or the like) may be used to make a determination for relay selection and/or reselection at the remote UE. In some embodiments, the determination for relay selection and/or reselection may be made at the serving network (e.g., RAN node, CN, another network entity, or the like) and may be provided to the remote UE (e.g., via a remote configuration, a pre-configuration, a response message, etc.).

In some embodiments, a potential relay UE candidate may not be utilizing any ongoing services for its own usage or for usage associated with any remote UEs and as a result may be in an RRC_IDLE or an RRC_INACTIVE state with a RAN node. In some embodiments, a potential relay UE candidate in an RRC_IDLE or an RRC_INACTIVE state may proceed to set up an RRC connection with a RAN node upon receipt of a solicitation message with a service-continuity indication from the remote UE. In some embodiments, the relay UE may proceed to setup the RRC connection if the relay UE has one or more Uu conditions above a predefined conditional threshold. In some embodiments, the predefined conditional threshold may be configured by the serving network of the relay UE. In some embodiments, the predefined conditional threshold may be configured by the remote UE with the service-continuity indication. In some embodiments, the predefined conditional threshold may be configured by a UE implementation at the relay UE. For example, the predefined conditional threshold may be configured at the relay UE based on a relay configuration.

In some embodiments, a potential relay UE candidate in an RRC_IDLE or an RRC_INACTIVE state may proceed with transmitting a response to a solicitation message from a remote UE prior to setup of an RRC connection. For example, the relay UE (i.e., the potential relay UE candidate) may not report to and/or consult with the serving network before responding directly, via SL, to the remote UE. In some embodiments, the relay UE in an RRC_IDLE or an RRC_INACTIVE state may indicate to the remote UE in the direct response message that the relay UE is not currently in an RRC_CONNECTED state. In some embodiments, the relay UE may indicated to the remote UE that the relay UE is currently in an RRC_IDLE or an RRC_INACTIVE state.

In some embodiments, in response to determining that one or more relay UEs are not currently in the RRC_CONNECTED state, the remote UE may select one or more of these relay UEs and may further cause transmission of a second request message (e.g., a second solicitation message, or the like) to these selected one or more relay UEs to trigger/cause the selected one or more relay UEs to setup an RRC connection. In some embodiments, the second request message may trigger/cause the selected one or more relay UEs to report to and consult with a serving network and then respond to the remote UE. In some embodiments, the remote UE may list the identities (e.g., an ID number, etc.) of the selected one or more relay UEs in the second request message explicitly. In some embodiments, the remote UE may set a response criteria for a responding relay UE to fulfill in order to decide whether to set up the RRC connection or not. In some embodiments, the response criteria for a responding relay UE may be a Sidelink Reference Signal Received Power (SL-RSRP).

In some embodiments, a first serving cell (e.g., NodeB, gNB, etc.) of a relay UE candidate may notify a second serving cell of a remote UE about information associated with at least the relay UE candidate. For example, the first serving cell may cause transmission of a notification message to the second serving cell to notify the second serving cell that the remote UE and the potential relay UE candidate are being served by the same serving network.

In some embodiments, a potential relay UE candidate may periodically cause transmission of an announcement message configured to assist/facilitate discovery of the potential relay UE candidate by a remote UE to indicate that the potential relay UE candidate may provide support with respect to one or more service-continuity indications, or requirements thereof. In some embodiments, a service-continuity indication may provide one or more criteria required of a potential relay UE candidate to be considered for U2N relaying by the remote UE. In some embodiments, the potential relay UE candidate may cause transmission of an announcement message in response to determining that the potential relay UE candidate fulfills one or more criteria of a set of criteria associated with (e.g., defined by) one or more service-continuity indications, for example, being in an RRC_CONNECTED state, having sufficient capability, status, condition, and/or the like. In some embodiments, the announcement message associated with the potential relay UE candidate may comprise a notification of the fulfillment of at least some of the criteria of the service-continuity indication. For example, the announcement message associated with the potential relay UE candidate may include, without limitation, a PC5 interface link quality measurement and an indication that the potential relay UE candidate is connected to a particular serving network.

In some embodiments, one or more remote UEs may receive the announcement message and determine to utilize the associated relay UE for U2N relaying. In some embodiments, the remote UE that requires a relay selection/reselection for service-continuity may discover and report one or more potential relay UE candidates that provided an announcement message and that support service-continuity to the current serving network of the remote UE. In some embodiments, the serving network may generate, and transmit, one or more relay configurations to configure the one or more potential relay UE candidates, that provided an announcement message, to act as potential relay UE candidates to the remote UE.

In some embodiments, the remote UE may report one or more potential relay UE candidates in an RRC_IDLE or INACTIVE state, that share a serving network with the remote UE, to the serving network and the serving network may page (e.g., cause transmission of a paging message, etc.) to the one or more reported potential relay UE candidates to setup/configure an RRC connection therewith. In some embodiments, the serving network may require an identifier associated with a reported potential relay UE candidate and the remote UE may provide an identifier for each reported potential relay UE candidate via a reporting message to the serving network. In some embodiments, an announcement message transmitted to and received by a remote UE may comprise an identifier associated with a respective potential relay UE candidate and this identifier may be reported by the remote UE to the serving network. In some embodiments, the paging message transmitted over the Uu interface from the serving network to the potential relay UE candidate may be enhanced to utilize one or more Sidelink User Equipment Identifiers (SL-UE-ID) associated with the reported relay UE as disclosed in the announcement message to the remote UE. In some embodiments, an SL-UE-ID may comprise one or more of a numerical value, a string of alpha-numeric characters, a Media Access Control (MAC) address, an Internet Protocol address (e.g., IPv4, IPv6, etc.), a Universally Unique Identifier (UUID), a Globally Unique Identifier (GUID), or the like.

In some embodiments, the remote UE that requires a relay selection/reselection for service-continuity may discover and select one or more potential relay UE candidates that support service-continuity to the current serving network of the remote UE. In some embodiments, the remote UE may cause transmission of a second request message to the selected one or more potential relay UE candidates to trigger/cause the selected one or more potential relay UE candidates to report to and consult with their serving network for responding to the remote UE.

As described above, the referenced flowcharts of methods that can be carried out by an apparatus according to related computer program products comprising computer program code. It will be understood that each block of the flowcharts, and combinations of blocks in the flowcharts, can be implemented by various means, such as hardware, firmware, processor, circuitry, and/or other devices associated with execution of software including one or more computer program instructions. For example, one or more of the procedures described above can be embodied by computer program instructions. In this regard, the computer program instructions which embody the procedures described above can be stored by a memory device, e.g., 204, of an apparatus, e.g., 200, employing an embodiment of the present disclosure and executed by processor, e.g., 202, of the apparatus. As will be appreciated, any such computer program instructions can be loaded onto a computer or other programmable apparatus (e.g., hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture, the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above. In other embodiments, the computer program instructions, such as the computer-readable program code portions, need not be stored or otherwise embodied by a non-transitory computer-readable storage medium, but can, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations, methods, steps, processes, apparatuses, or the like, above can be modified or further amplified. Furthermore, in some embodiments, additional optional operations, methods, steps, processes, hardware, or the like, can be included.

Modifications, additions, subtractions, inversions, correlations, proportional relationships, disproportional relationships, attenuation and/or amplifications to the operations above can be performed in any order and in any combination. It will also be appreciated that in instances where particular operations, methods, processes, or the like, required particular hardware such hardware may be considered as part of apparatus 200 for any such embodiment.

Many modifications and other embodiments of the present disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims.

Moreover, although the foregoing descriptions and the associated drawings describe certain example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

What is claimed is:

1. An apparatus comprising:
   at least one processor; and
   at least one memory including computer program code,
   the at least one memory and the computer program code configured to, with the at least one processor, cause the apparatus at least to:
      discover, by a remote user equipment, one or more potential relay user equipment candidates over a sidelink, wherein the discovering comprises:
         determine, based on a predefined conditional threshold comprising a sidelink reference signal received power (SL-RSRP), that the remote user equipment has lost coverage with a current user equipment-to-network (U2N) path configuration;
         based on the determining, transmit a solicitation message comprising a service-continuity indication, wherein the solicitation message is broadcast as a one-time transmission, wherein the service-continuity indication comprises assistance information including a remote access mode, a serving cell identity, a serving relay identity, a service characteristic, a service requirement, a user equipment capability, a user equipment status, a quality of service metric, and an interface link quality; and
         receive one or more proactive announcement messages from each of the one or more potential relay user equipment candidates, wherein each of the one or more proactive announcement messages comprises: a capability of a respective potential relay user equipment candidate of the one or more potential relay user equipment candidates to support service-continuity, and a notification that the respective potential relay user equipment candidate is in an RRC_CONNECTED state, and a PC5 interface link quality measurement, an indication of connection to a serving network, and an identification of a sidelink user equipment identifier; and
      receive, by the remote user equipment, information identifying a set of potential relay user equipment candidates in response to the solicitation message, wherein the information is received via:
         one or more response messages received from at least one of the one or more potential relay user equipment candidates in response to the solicitation message over the sidelink;
         the one or more proactive announcement messages; and
         a remote configuration from a serving network; and
      prioritize, by the remote user equipment, the identified set of potential relay user equipment candidates, wherein the prioritizing comprises selecting a first relay user equipment candidate identified by the serving network over a second relay user equipment candidate that responded directly over the sidelink to the remote user equipment without consulting the serving network.

2. The apparatus according to claim 1, wherein the remote configuration is received via a network connection and the network connection comprises a direct cellular access connection via a serving radio access network node.

3. The apparatus according to claim 1, wherein the remote configuration is received via a network connection and the network connection comprises a user equipment to a network relay connection via a serving relay user equipment and a serving radio access network node of the serving relay user equipment.

4. The apparatus according to claim 3, wherein the transmission of the solicitation message comprises causing the broadcast of the solicitation message within a communicable range of the remote user equipment, and wherein the broadcast of the solicitation message is received by at least one a relay user equipment within the communicable range of the remote user equipment.

5. The apparatus according to claim 4, wherein the service-continuity indication is transmitted via: sidelink control information used for scheduling the sidelink transmission of the solicitation message, a control element of a medium access control protocol, a radio resource control signaling message, and an information element in the solicitation message.

6. The apparatus according to claim 5, wherein the transmission of the solicitation message comprising the service-continuity indication utilizes an exclusive sidelink logical channel, and wherein the exclusive sidelink logical channel is specified as a common sidelink logical channel used for transmitting the solicitation message by the remote user equipment for the discovery over the sidelink in an instance service-continuity required by the remote user equipment.

7. A method performed by a remote user equipment, the method comprising:
   discovering one or more potential relay user equipment candidates over a sidelink, wherein the discovering comprises:
      determining, based on a predefined conditional threshold comprising a sidelink reference signal received power (SL-RSRP), that the remote user equipment has lost coverage with a current user equipment-to-network (U2N) path configuration;
      based on the determining, transmitting a solicitation message comprising a service-continuity indication, wherein the solicitation message is broadcast as a one-time transmission, wherein the service-continuity indication comprises assistance information including a remote access mode, a serving cell identity, a serving relay identity, a service characteristic, a service requirement, a user equipment capability, a user equipment status, a quality of service metric, and an interface link quality; and receiving one or more proactive announcement messages from each of the one or more potential relay user equipment candidates, wherein each of the one or more proactive announcement messages comprises: a capability of a respective potential relay user equipment candidate of the one or more potential relay user equipment candidates to support service-continuity, and a notification that the respective potential relay user equipment candidate is in an RRC_CONNECTED state, and a PC5 interface link quality measurement, an indication of connection to a serving network, and an identification of a sidelink user equipment identifier; and receiving information identifying a set of potential relay user equipment candidates in response to the solicitation message, wherein the information is received via:

one or more response messages received from at least one of the one or more potential relay user equipment candidates in response to the solicitation message over the sidelink;

the one or more proactive announcement messages; and a remote configuration from a serving network; and prioritizing the identified set of potential relay user equipment candidates, wherein the prioritizing comprises selecting a first relay user equipment candidate identified by the serving network over a second relay user equipment candidate that responded directly over the sidelink to the remote user equipment without consulting the serving network.

* * * * *